US007350286B2

(12) United States Patent
Asano et al.

(10) Patent No.: US 7,350,286 B2
(45) Date of Patent: Apr. 1, 2008

(54) ROTATIONAL AND AXIAL POWER TRANSMITTING APPARATUS

(75) Inventors: Yoshiaki Asano, Anjo (JP); Shingo Hashimoto, Anjo (JP)

(73) Assignee: Aisin AW Co., Ltd. (JP)

( * ) Notice: Subject to any disclaimer, the term of this patent is extended or adjusted under 35 U.S.C. 154(b) by 249 days.

(21) Appl. No.: 10/935,625

(22) Filed: Sep. 8, 2004

(65) Prior Publication Data

US 2005/0050720 A1    Mar. 10, 2005

(30) Foreign Application Priority Data

Sep. 10, 2003  (JP)  ............... 2003-318902
Sep. 24, 2003  (JP)  ............... 2003-332519

(51) Int. Cl.
*B23P 19/00*    (2006.01)

(52) U.S. Cl. ............ 29/700; 29/407.02; 29/407.03; 29/434; 29/709; 29/240; 173/5; 173/176; 173/181

(58) Field of Classification Search ............ 29/407.02, 29/407.03, 434, 700, 709, 714, 240; 173/5, 173/176, 181; 72/74, 112, 120, 454, 455
See application file for complete search history.

(56) References Cited

U.S. PATENT DOCUMENTS

| 5,469,924 A * | 11/1995 | Kanamori et al. ......... 173/176 |
| 5,549,169 A * | 8/1996 | Matsumura et al. ....... 173/176 |
| 6,684,506 B2 * | 2/2004 | Rode ....................... 29/898.09 |
| 2002/0124407 A1 * | 9/2002 | Ullom ..................... 29/898.09 |

FOREIGN PATENT DOCUMENTS

| DE | 3239192 A * | 5/1984 |
| JP | 2001-062649 | 3/2001 |

* cited by examiner

*Primary Examiner*—Jermie E. Cozart
(74) *Attorney, Agent, or Firm*—Bacon & Thomas, PLLC

(57) ABSTRACT

Threaded member assembling can be performed using a rotational/axial-movement-transmitting unit including an upper frame; a motor held by the upper frame; a female threaded member secured to the upper frame; a male threaded member assembled in the female threaded member, the male threaded member having a rotational/axial-movement-transmitting end at one end, and having a driven rotary end at the other end; and a joint member connecting an output terminal of the motor to the driven rotary end for transmitting rotation torque from the output terminal to the driven rotary end and for allowing axial movement of the male threaded member relative to the motor.

18 Claims, 12 Drawing Sheets

US 7,350,286 B2

ROTATIONAL AND AXIAL POWER TRANSMITTING APPARATUS

CROSS-REFERENCE TO RELATED APPLICATIONS

This application claims priority of Japanese Patent Application 2003-332519 filed Sep. 24, 2003 and Japanese Patent Application 2003-318902 filed Sep. 10, 2003 both of which are incorporated by reference herein in their entirety.

BACKGROUND OF THE INVENTION

1. Field of the Invention

The present invention relates to a power apparatus for assembling threaded members, swaging members or pressing members.

2. Description of the Related Art

A prior art apparatus that automatically assembles a nut and a bolt together is disclosed in Japanese Unexamined Patent Application Publication No. 2001-062649. This threaded member assembling apparatus has separate rotary and axial actuators for rotating and axially moving the bolt. Employment of separate rotary and axial actuators in the prior art automatic threaded member assembling apparatus requires a complicated structure along with a complex control, such as synchronous control of both actuators.

SUMMARY OF THE INVENTION

The present invention overcomes the deficiencies of the prior art by providing, for example, an automatic threaded member assembling mechanism, a swaging mechanism, or a pressing mechanism having a simple structure which is easily and simply controlled.

As a result of extensive study and trial and error to solve the problems described above, there has been discovered a structure forming a single actuator producing simultaneous rotational and axial movement and which can be combined with and drive a threaded member assembling, swaging or pressing mechanism.

A rotational/axial-movement-transmitting unit in accordance with the present invention includes a frame; a rotary drive apparatus held by the frame; a female threaded member secured to the frame; a male threaded member mating with the female threaded member, the male threaded member having a rotational/axial-movement-transmitting end at one end, and having a driven rotary end at the other end; and a joint member connecting the output of the rotary drive apparatus to the driven rotary end for transmitting rotation torque from the rotary drive apparatus to the male threaded member while permitting axial movement of the male threaded member relative to the rotary drive apparatus.

A threaded member assembling apparatus including the rotational/axial-movement-transmitting unit of the present invention includes a base holding a workpiece having a threaded portion for receiving a nut or a bolt; a rotational/axial-movement-transmitting unit secured to the side remote from the threaded portion of the workpiece, the rotational/axial-movement-transmitting unit including a frame; a rotary drive apparatus held by the frame; a female threaded member secured to the frame; a male threaded member assembled in the female threaded member, the male threaded member having a rotational/axial-movement-transmitting end at one end, and having a driven rotary end at the other end; and a joint member connected to both an output terminal of the rotary drive apparatus and the driven rotary end for transmitting rotation torque from the rotary drive apparatus to the male threaded member while permitting axial movement of the male threaded member relative to the rotary drive apparatus; and a threaded member assembling tool including a gripping member at one end and an engaging member at the other end, the gripping member gripping the nut or the bolt such that the nut or the bolt can be attached and removed; and the engaging member engaging with the rotational/axial-movement-transmitting end, and compensating for the axial movement of the rotational/axial-movement-transmitting unit while transmitting the rotation torque of the rotational/axial-movement-transmitting unit.

A swaging apparatus including the rotational/axial-movement-transmitting unit of the present invention includes a base holding a workpiece having a threaded portion assembled with a nut or a bolt; a rotational/axial-movement-transmitting unit secured to the side remote from the threaded portion of the workpiece secured to the base, the rotational/axial-movement-transmitting unit including a frame; a rotary drive apparatus held by the frame; a female threaded member secured to the frame; a male threaded member assembled in the female threaded member, the male threaded member having a rotational/axial-movement-transmitting end at one end, and having a driven rotary end at the other end; and a joint member connected to both an output terminal of the rotary drive apparatus and the driven rotary end for transmitting rotation torque from the rotary drive apparatus to the male threaded member while permitting axial movement of the male threaded member relative to the rotary drive apparatus; and a swaging tool including a swaging portion at one end and an engaging portion at the other end, the swaging portion being in contact with a part of the nut or the bolt to swage the nut or the bolt to the threaded portion; and the engaging portion engaging with the rotational/axial-movement-transmitting end of the male threaded member to transmit the axial movement of the rotational/axial-movement-transmitting unit.

A pressing apparatus including the rotational/axial-movement-transmitting unit of the present invention includes a base holding a workpiece in which a member-to-be-assembled is to be pressed and mounted; a rotational/axial-movement-transmitting unit secured to the side remote from the threaded portion of the workpiece secured to the base, the rotational/axial-movement-transmitting unit including a frame; a rotary drive apparatus held by the frame; a female threaded member secured to the frame; a male threaded member assembled in the female threaded member, the male threaded member having a rotational/axial-movement-transmitting end at one end, and having a driven rotary end at the other end; and a joint member connected to both an output terminal of the rotary drive apparatus and the driven rotary end for transmitting rotation torque from the rotary drive apparatus to the male threaded member while permitting axial movement of the male threaded member relative to the rotary drive apparatus; and a pressing tool including a gripping member at one end and an engaging member at the other end, the gripping member gripping the member-to-be-assembled such that the member-to-be-assembled can be attached and removed; and the engaging member engaging with the rotational/axial-movement-transmitting end of the male threaded member to transmit the axial movement of the rotational/axial-movement-transmitting unit.

The rotational/axial-movement-transmitting unit of the present invention is capable of rotating and axially moving the rotational/axial-movement-transmitting end relative to the frame. Specifically, the rotation of the output terminal of the rotary drive apparatus relative to the frame is transmitted to the joint member and rotates it. The rotation of the joint means rotates the driven rotary end, which then rotates the male threaded member including the driven rotary end relative to the frame. Thus, the rotational/axial-movement-transmitting end rotates relative to the frame. Moreover, the rotation of the male threaded member axially moves the male threaded member, which is assembled in the female threaded member, relative to the female threaded member. That is, the male threaded member can be moved in the axial direction relative to the frame to which the female threaded member is secured. Here, the axial direction refers to the rotational axis of the rotary drive apparatus.

Conventionally, as described above, the transmission of rotation torque and the transmission of axial movement require their respective independent actuators. However, the actuator required in the rotational/axial-movement-transmitting unit of the present invention is the rotary driver only. Thus, the structure of the rotational/axial-movement-transmitting unit can be simplified and cost reduction can be achieved. In addition, complex control, such as synchronous control of two actuators is no longer required, since, in the rotational/axial-movement-transmitting unit of the present invention, the actuator to be controlled is the rotary driver only. That is, only the rotational control of the rotary driver is required. This also leads to cost reduction.

In the threaded member assembling apparatus including the rotational/axial-movement-transmitting unit according to the present invention, rotation torque can be transmitted from the rotational/axial-movement-transmitting unit to the threaded member assembling tool. Specifically, the rotation torque of the rotational/axial-movement-transmitting end of the rotational/axial-movement-transmitting unit is transmitted through the engaging member of the threaded member assembling tool to the gripping member. Since the threaded member assembling tool compensates for the axial movement of the rotational/axial-movement-transmitting unit, the axial movement is not transmitted to the gripping member. Thus, the nut or the bolt gripped by the gripping member can be rotated relative to the threaded portion of the workpiece secured to the base and can be assembled with the threaded portion of the workpiece.

In the swaging apparatus including the rotational/axial-movement-transmitting unit according to the present invention, axial movement can be transmitted from the rotational/axial-movement-transmitting unit to the swaging tool. Specifically, the axial movement of the rotational/axial-movement-transmitting end of the rotational/axial-movement-transmitting unit is transmitted through the engaging member of the swaging tool to the swaging member. Here, the rotation torque of the rotational/axial-movement-transmitting unit is not transmitted to the swaging tool. That is, the swaging member can be axially moved without being rotated. The nut or the bolt secured to the base and the threaded portion of the workpiece can thus be swaged by axially pressing the swaging member in the area where the threaded portion of the workpiece and the nut or the bolt are assembled together.

In the pressing apparatus including the rotational/axial-movement-transmitting unit according to the present invention, axial movement can be transmitted from the rotational/axial-movement-transmitting unit to the member-being-assembled. Specifically, the axial movement of the rotational/axial-movement-transmitting end of the rotational/axial-movement-transmitting unit is transmitted through the engaging member of the pressing tool to the member-being-assembled. Here, the rotation torque of the rotational/axial-movement-transmitting unit is not transmitted to the pressing tool. That is, the member-being-assembled gripped by the gripping member can be axially moved without being rotated. The member-being-assembled can thus be pressed into the workpiece secured to the base.

As described above, the threaded member assembling apparatus, the swaging apparatus, and the pressing apparatus are different in their workpieces and tools. In other words, each apparatus can function as any other apparatuses by replacing its workpiece and tool. Examples of such apparatuses include an assembly apparatus for mounting parts to a rotor of a motor. Specifically, the pressing apparatus can secure silicon steel sheets (member-being-assembled) to a rotor shaft (workpiece). The threaded member assembling apparatus can assemble a locknut to a threaded portion of a rotor body (workpiece) in which silicon steel sheets are mounted. The swaging apparatus can swage a threaded portion of a rotor body and a locknut. Moreover, the pressing apparatus can secure silicon steel sheets of a resolver (member-being-assembled) to a rotor body (workpiece). When the workpiece is a rotor body including a resolver and the member-being-assembled is a key for positioning of the rotor body and the resolver, the pressing apparatus can insert the key into the rotor body. In addition, when the workpiece is the rotor body including the resolver and the key, and the member-being-assembled is a locking component for the resolver and the key, the pressing apparatus can press the locking component to the rotor body.

Although three separate apparatuses have been conventionally required for mounting parts to a rotor, one rotor assembly system according to the present invention can serve three functions, as described above, by replacing workpieces and tools. Thus, reduction in facilities leads to cost reduction and space savings.

DESCRIPTION OF THE PREFERRED EMBODIMENTS

Figure 1:
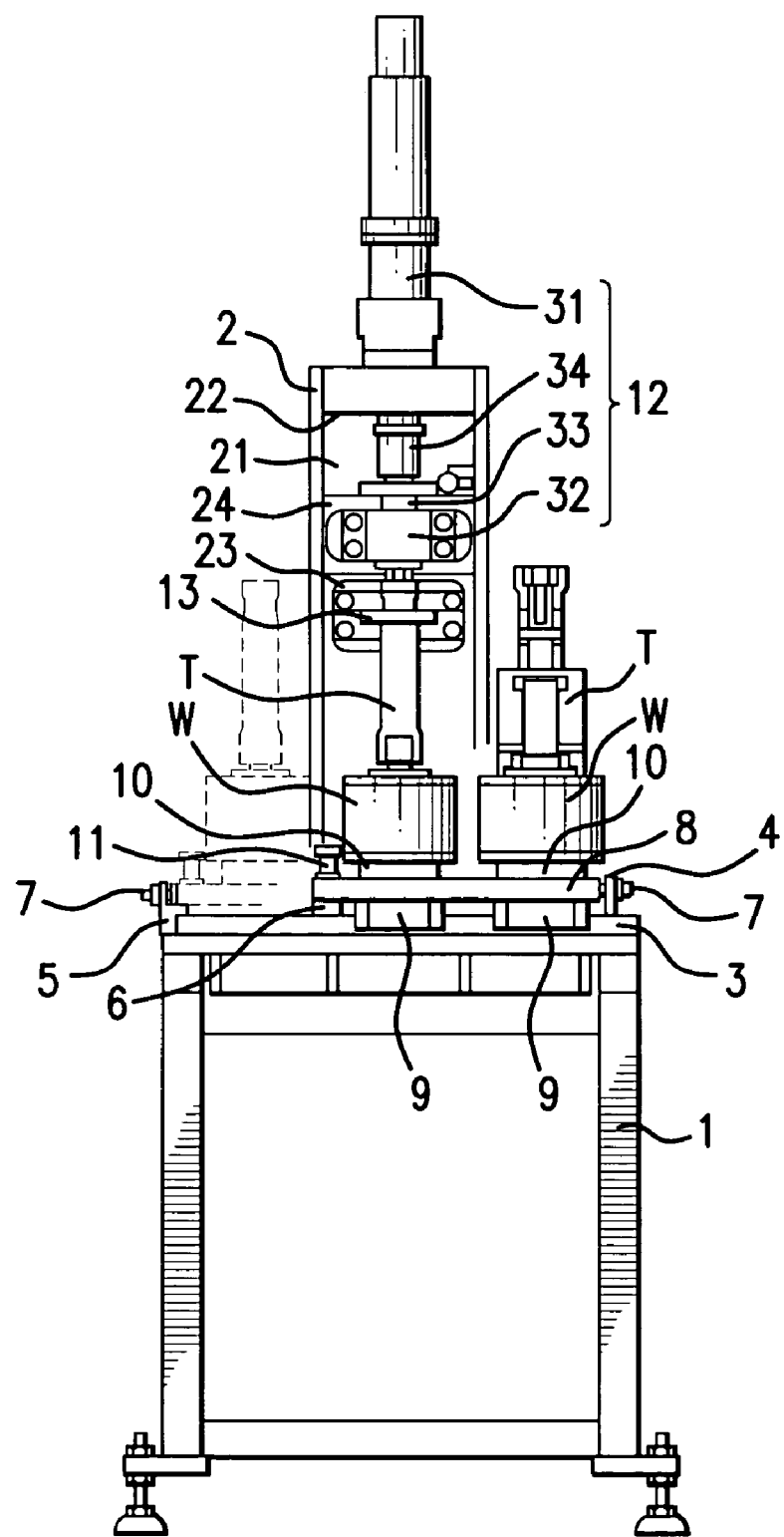
FIG. 1 is a front view of a rotor assembly system according to an embodiment of the present invention.

Embodiments of the present invention will now be described in detail.

The rotary drive apparatus of the rotational/axial-movement-transmitting unit according to the present invention preferably includes a motor, a torque sensor and/or a rotation angle sensor. A torque sensor allows the rotation torque transmitted to the rotational/axial-movement-transmitting end of the male threaded member to be properly controlled, while a rotation angle sensor allows the axial stroke of the rotational/axial-movement-transmitting end to be properly controlled. The rotary drive apparatus may be, for example, a power nut driver having a torque sensor and a rotation angle sensor.

The driven rotary end of the rotational/axial-movement-transmitting unit according to the present invention may be polygonal in cross section. One end of the joint member may be provided with a hole having a polygonal cross-section, the hole in which the driven rotary end is fitted. Alternatively, the driven rotary end may be provided with a hole having a polygonal cross-section while one end of the joint member may be a shaft having a polygonal cross-section with the shaft slidably fitted in the driven rotary end, or the joint member may be some other type of splined joint connection to the driven rotary end. Thus, the rotation of the output terminal of the rotary driver is fully transmitted through the joint member to the male threaded member, while the joint member and the driven rotary end are slidable in the axial direction. As a result, rotation torque is reliably transmitted from the rotary drive apparatus to the male threaded member, while the male threaded member is axially movable relative to the output of the rotary drive apparatus.

The rotary drive apparatus of the threaded member assembling apparatus according to the present invention preferably includes a motor, a torque sensor and/or a rotation angle sensor. A torque sensor allows the tightening torque of the nut or the bolt to be accurately controlled. That is, the nut or the bolt can be assembled to a threaded portion of a workpiece with proper torque. On the other hand, a rotation angle sensor allows the rotation angle of the nut or the bolt to be accurately controlled. That is, the nut or the bolt can be positioned at a predetermined rotational position. Moreover, a rotation angle sensor allows the rotation speed and the rotation time of the nut or the bolt to be accurately controlled. The rotary drive apparatus may be, for example, a power nut driver having a torque sensor and a rotation angle sensor.

The rotary drive apparatus of the threaded member assembling apparatus according to the present invention preferably includes a motor, a torque sensor and a rotation angle sensor. The threaded member assembling apparatus can further include a control unit controlling the motor, the control unit including rotation-torque calculation means calculating the rotational torque of the threaded member assembling tool based on a detection signal from the torque sensor; rotation-angle calculation means calculating the rotation angle of the threaded member assembling tool based on a detection signal from the rotation angle sensor; and assembled-state determination means determining the threaded member assembling state between the nut or the bolt and the threaded portion of the workpiece, based on the rotational torque calculated by the rotation-torque calculation means and the rotation angle calculated by the rotation-angle calculation means. Thus, it can be determined whether the nut or the bolt is properly assembled to the threaded portion of the workpiece.

The rotary drive apparatus of the swaging apparatus according to the present invention is preferably a motor and a torque sensor. The swaging apparatus can further include a control unit controlling the motor, the control unit including swaging-force instruction-value input means for inputting a swaging-force instruction-value of the swaging tool; swaging-force calculation means calculating a swaging force of the swaging tool based on a detection signal from the torque sensor; and rotation-torque control means controlling the rotation torque of the motor based on the swaging-force instruction-value and the swaging force. Thus, the nut or the bolt and the workpiece can be swaged with a proper swaging force.

The rotary drive apparatus of the swaging apparatus according to the present invention is preferably a motor and a rotation angle sensor. The swaging apparatus can further include a control unit controlling the motor, the control unit including stroke calculation means calculating a stroke of the swaging tool based on a detection signal from the rotation angle sensor; and swaging-state determination means determining, based on the stroke, the swaging state between the nut or the bolt and the threaded portion of the workpiece. This allows the amount of swaging by the swaging tool to be accurately controlled. Thus, it can be determined whether the nut or the bolt is properly swaged to the workpiece. Moreover, a motor having a rotation angle sensor allows the rotation speed and the rotation time of the swaging tool to be accurately controlled. The rotary drive apparatus may be, for example, a power nut driver having a torque sensor and a rotation angle sensor.

In the pressing apparatus of the present invention, the workpiece may include a shaft having an insertion groove at an eccentric position, and a rotational body having an insertion groove at an eccentric position and being rotatable relative to the shaft. The member-to-be-assembled may be a key disposed in the insertion groove of the shaft and in the insertion groove of the rotational body so as to determine the positions of the shaft and the rotational body. Thus, the pressing apparatus of the present invention can be used as a key insertion apparatus.

In the pressing apparatus of the present invention, the workpiece may include a shaft; a rotational body rotatable relative to the shaft; and a key disposed in the shaft and the rotational body so as to determine the positions of the shaft and the rotational body. The member-being-assembled may be a locking component locking the key, the shaft, and the rotational body. Thus, the pressing apparatus of the present invention can be used as a locking-component mounting apparatus for mounting a locking component, such as a retaining plate.

The rotary drive apparatus of the pressing apparatus according to the present invention may be a motor and a torque sensor. The pressing apparatus may further include a control unit controlling the motor, the control unit including pressing-force instruction-value input means for inputting a pressing-force instruction-value of the pressing tool; pressing-force calculation means calculating a pressing force of the pressing tool based on a detection signal from the torque sensor; and rotation-torque control means controlling the rotation torque of the motor based on the pressing-force instruction-value and the pressing force. Thus, the member-being-assembled can be mounted in a workpiece with a proper pressing force.

The rotary drive apparatus of the pressing apparatus according to the present invention may be a motor and a rotation angle sensor. The pressing apparatus may further include a control unit controlling the motor, the control unit including stroke calculation means calculating a stroke of the pressing tool based on a detection signal from the rotation angle sensor; and mounting-state determination means determining, based on the stroke, the mounting state of the member-being-assembled to the workpiece. This allows the amount of pressing by the pressing tool to be accurately controlled. Thus, it can be determined whether the member-being-assembled is properly pressed to the workpiece. Moreover, a rotation angle sensor allows the rotation speed and the rotation time of the member-being-assembled to be accurately controlled. The rotary drive apparatus may be, for example, a power nut driver having a torque sensor and a rotation angle sensor.

The rotary drive apparatus of the pressing apparatus according to the present invention may be a motor, a torque sensor and a rotation angle sensor. The pressing apparatus may further include a control unit controlling the motor, the control unit including pressing-force instruction-value input means for inputting pressing-force instruction-values of the pressing tool, the instruction-values corresponding to a high pressing-force and a low pressing-force; pressing-force calculation means calculating a pressing force of the pressing tool based on a detection signal from the torque sensor; rotation-torque control means controlling the rotation torque of the motor based on the pressing-force instruction-value and the pressing force; stroke calculation means calculating a stroke of the pressing tool based on a detection signal from the rotation angle sensor when the motor is controlled by the rotation-torque control means; and failure determination means determining that the mounting state of the member-being-assembled to the workpiece is faulty, if the stroke is equal to or more than a first predetermined value when the motor is controlled based on the pressing-force instruction-value of the low pressing-force, or if the stroke is equal to or less than a second predetermined value when the motor is controlled based on the pressing-force instruction-value of the high pressing-force.

That is, at least two levels of pressing forces, a low pressing-force and a high pressing-force, are applied to the member-being-assembled to the workpiece. It can be determined, based on the state of mounting when each level of pressing force is applied, whether the member-being-assembled is mounted to the workpiece with an appropriate level of pressing force, i.e., a pressing force between the low and high pressing-forces. The completion of mounting is determined based on whether the stroke of the pressing tool reaches the predetermined values (the first predetermined value and the second predetermined value). When, specifically, the member-being-assembled is not mounted to the workpiece with a low pressing-force but is mounted with a high pressing-force, it is determined that the member-being-assembled is mounted to the workpiece with an appropriate pressing-force. In other words, the mounting state is determined to be defective when the member-being-assembled is mounted to the workpiece with a low pressing-force or when not mounted with a high pressing-force. The level of the first predetermined value and the second predetermined value may be either equal or unequal. Moreover, the motor can adjust and widen the difference between the levels of the low pressing-force and the high pressing-force with high precision. For example, the level of the low pressing-force can be one-tenth or one-hundredth the level of the high pressing-force. In a known hydraulic pressing system, the level of the low pressing-force can only be adjusted to about one-tenth the level of the high pressing-force.

The control unit of the pressing apparatus according to the present invention may further include operation-time calculation means calculating the operation time during which the motor is controlled by the rotation-torque control means. The failure determination means may determine that the mounting state of the member-being-assembled to the workpiece is faulty, if the stroke is equal to or more than a first predetermined value when the motor is controlled for a first predetermined operation time based on the pressing-force instruction-value of the low pressing-force, or if the stroke is equal to or less than a second predetermined value when the motor is controlled for a second predetermined operation time based on the pressing-force instruction-value of the high pressing-force. That is, the determination whether the stroke of the pressing tool is equal to or more than the first predetermined value, or equal to or less than the second predetermined value can be made based on the consideration of the operation time. Thus, the mounting state can be accurately determined.

EMBODIMENTS

Overall Structure of Rotor Assembly System

Figure 2:
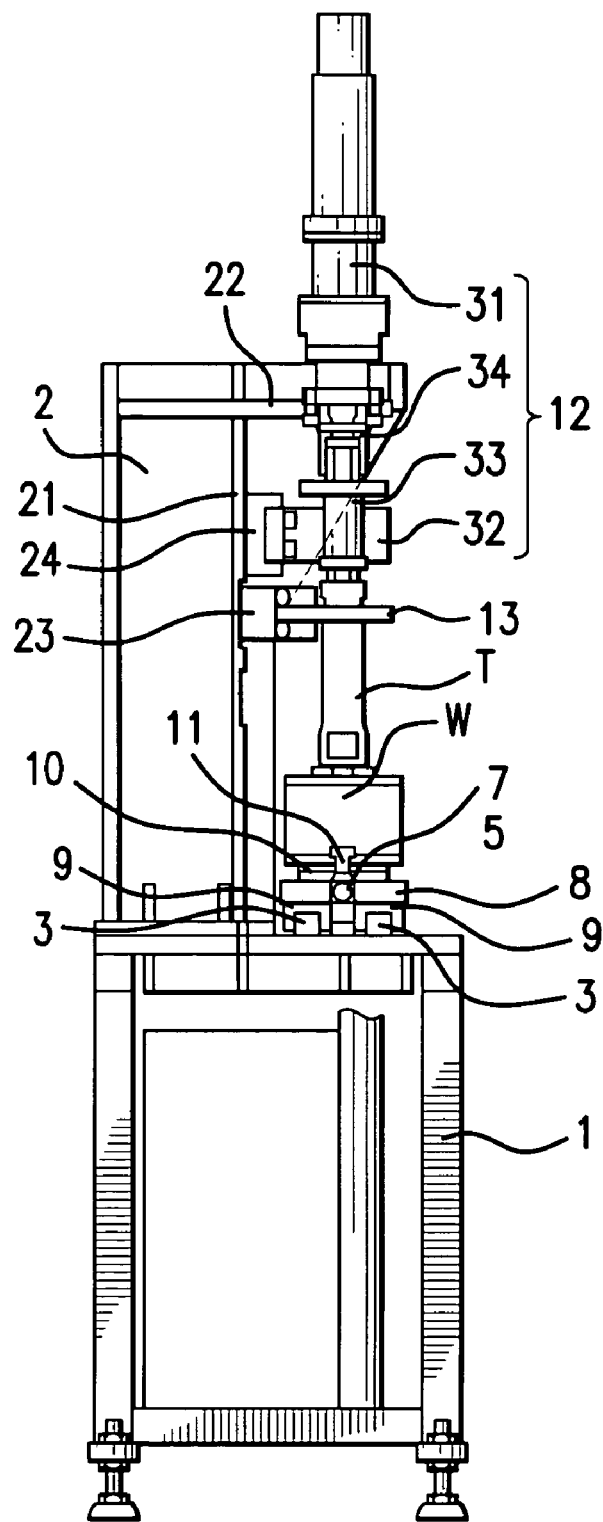
FIG. 2 is a left-side cross-sectional view of the rotor assembly system according to the embodiment.

The overall structure of a rotor assembly system according to one embodiment as shown in FIGS. 1 and 2 has a lower frame ("base") 1 secured to the installation surface, and an upper frame ("frame") 2 secured upright to the rear side on the upper surface of the lower frame 1. In addition, two rails 3, a right stopper holder 4, a left stopper holder 5, and a positioning stopper holder 6 are secured to the upper surface of the lower frame 1.

The two rails 3 are horizontally oriented (left-to-right orientation in FIG. 1), substantially parallel to each other, and secured to the front side of the upper surface of the lower frame 1. The right stopper holder 4 is located at the right end of the upper surface of the lower frame 1 and is secured substantially between the two rails 3. This right stopper holder 4 has a throughhole (not shown) in the horizontal direction. An end stopper bolt 7 is horizontally installed in the throughhole of the right stopper holder 4 such that the bolt head is directed to the inside of the rotor assembly system. The left stopper holder 5 is located at the left end on the upper surface of the lower frame 1, secured substantially between the two rails 3, and is opposite the right stopper holder 4. This left stopper holder 5 has throughholes (not shown) in the horizontal and vertical directions. Another end stopper bolt 7 is horizontally installed in the horizontal throughhole of the left stopper holder 5 such that the bolt head is directed inside the rotor assembly system. The end stopper bolts 7 serve as the left and right stoppers for a moving table 8 described below. The vertical throughhole of the left stopper holder 5 serves as a left positioning hole for the moving table 8. The positioning stopper holder 6 is located substantially at the center of the upper surface of the lower frame 1 and secured substantially between the two rails 3. This positioning stopper holder 6 has a throughhole (not shown) in the vertical direction. The positioning stopper holder 6 determines the position the table 8 on the right side of the lower frame 1.

The moving table 8 is horizontally movably above the two rails 3. Specifically, four guides 9 mounted on the bottom of the table 8 slidably mount the table on the rails 3. Two guides 9 are slidably attached to each rail 3. Moreover, two chucks 10 to/from which workpieces W can be attached/detached are secured to the respective left and right sides on the upper surface of the moving table 8. The shapes of the chucks 10 vary depending on the type of a workpiece W. A positioning bolt 11 at the left end of the upper surface of the moving table 8 has a downward protrusion (not shown) for being engaged with the vertical throughholes (not shown) in the positioning stoppers 5 and 6 to releasably secure the table 8 in the left and right positions.

A rotational/axial-movement-transmitting unit 12 described below is mounted on the upper frame 2. A tool-rotation-locking member 13 for locking the rotation of a predetermined tool T is attached to a first flange 23 protruding from a standing surface 21 of the upper frame 2 toward the front side. The tool-rotation-locking member 13 is substantially U-shaped, and its open side is secured to the first flange 23. In the present embodiment, the tool T using the tool-rotation-locking member 13 is a swaging tool T2 (FIG. 6), a key insertion tool T3 (FIG. 8), or a locking-component-mounting tool T4 (FIG. 9) that will be described below.

Horizontal positioning of the moving table 8 will now be described. When the moving table 8 is positioned on the right, as shown in FIG. 1, the right side-surface of the moving table 8 is in contact with the head of the end stopper bolt 7 installed in the right stopper holder 4. In addition, the protrusion at the lower end of the positioning bolt 11 is disposed in the throughhole of the positioning stopper holder 6. When the moving table 8 is positioned on the right, a workpiece W held by the left chuck 10 is processed in a predetermined manner. In this case, a workpiece W to be subsequently processed is held by the right chuck 10.

On the other hand, when the moving table 8 is positioned on the left, the left side-surface of the moving table 8 is in contact with the head of the end stopper bolt 7 installed in the horizontal throughhole of the left stopper holder 5. In addition, the protrusion at the lower end of the positioning bolt 11 is disposed in the vertical throughhole of the left stopper holder 5. When the moving table 8 is positioned on the left, a workpiece W held by the right chuck 10 is processed in a predetermined manner. In this case, a workpiece W to be subsequently processed is held by the left chuck 10.

Structure of Rotational/axial-movement-transmitting Unit

Figure 3:
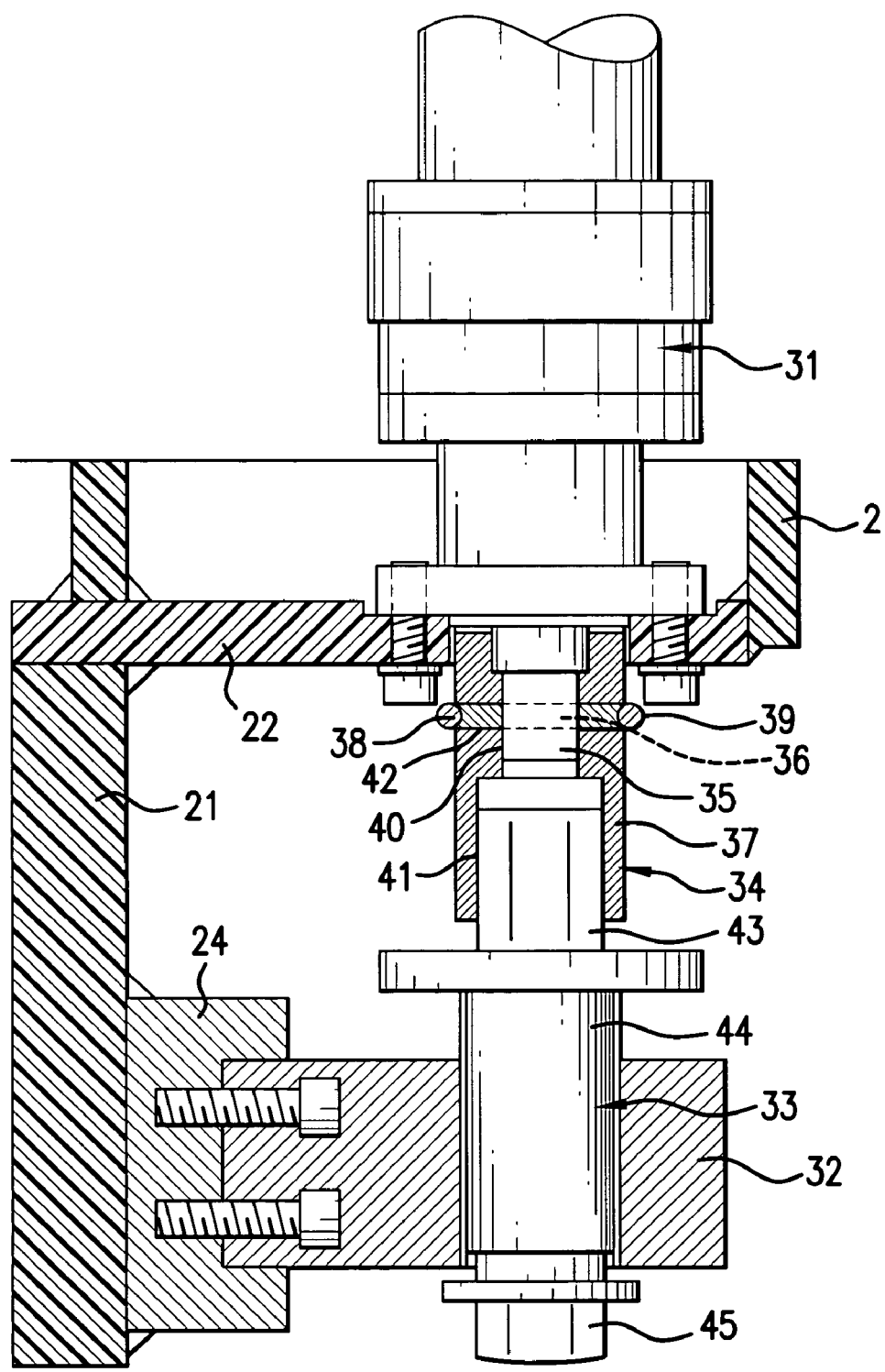
FIG. 3 is a cross-sectional view of a rotational/axial-movement-transmitting unit.

The structure of the rotational/axial-movement-transmitting unit 12 as shown in FIGS. 1 to 3, includes a motor (rotary drive apparatus) 31, a female threaded member 32, a male threaded member 33, and a joint member (joint means) 34. The motor 31 is secured to the upper surface of an upper-end horizontal surface 22 of the upper frame 2 such that a rotary shaft of the motor 31 can be rotated about the vertical axis. Moreover, an output portion or terminal 35 on the lowest end of the rotary shaft of the motor 31 protrudes downward from a throughhole formed in the upper-end horizontal surface 22 of the upper frame 2. The output terminal 35 of the motor 31 has a throughhole 36 formed in the direction orthogonal to the rotary shaft of the motor 31. The motor 31 has a torque sensor (not shown) capable of detecting the rotation torque of the rotary shaft (output terminal 35), and a rotation angle sensor (not shown) capable of detecting the rotation angle of the rotary shaft.

The female threaded member 32 is secured to a second flange 24 protruding frontward from the standing surface 21 of the upper frame 2. The center of the rotary shaft of the motor 31 and the threaded portion of the female threaded member 32 are aligned on the same axis.

The joint member 34 includes a substantially cylindrical joint portion 37, a retaining pin 38, and an O-ring 39. The output terminal 35 of the motor 31 is square in cross section and is fitted in an upper hole 40 of the joint portion 37, the upper hole 40 also being square in cross section. A driven rotary end 43 of the male threaded member 33 described below is fitted in a lower hole 41 of the joint portion 37, the lower hole 41 being hexagonal in cross section. The upper side of the joint portion 37 is provided with a groove on the outer surface. The groove is provided with a throughhole 42 extending in the direction orthogonal to the axis of the joint portion 37. The retaining pin 38 is columnar in shape and has substantially the same length as the internal diameter of the grooved portion of the joint portion 37. The retaining pin 38 is fitted in both the throughhole 42 of the joint portion 37 and the output terminal 35 of the motor 31 so as to prevent the joint portion 37 from dropping. That is, the retaining pin 38 connects the joint portion 37 and the output terminal 35 of the motor 31. The O-ring 39 is fitted in the groove of the joint portion 37 so as to prevent the retaining pin 38 in the throughhole 42 of the joint portion 37 from protruding to the outside.

The driven rotary end 43, a male thread portion 44, and a rotational/axial-movement-transmitting end 45 are integrated to constitute the male threaded member 33. The driven rotary end 43 is a shaft having a hexagonal cross-section. The driven rotary end 43 is fitted in the lower hole 41 of the joint portion 37, and is axially movable relative to the lower hole 41 of the joint portion 37. The male thread portion 44 is located below the driven rotary end 43 and has a male thread on the outer surface. The male thread of the male thread portion 44 mates with and is assembled in a female thread of the female threaded member 32. The rotational/axial-movement-transmitting end 45 is located below the male thread portion 44 and is a shaft having a hexagonal cross-section. The rotational/axial-movement-transmitting end 45 transmits rotation torque and axial movement to the tool T constituting another component. The rotational/axial-movement-transmitting end 45 is fitted to the threaded member assembling tool T1 described below.

The operation of the rotational/axial-movement-transmitting unit 12 will now be described. First, the motor 31 rotates according to an output instruction value from a control unit (not shown). The rotation of the motor 31 rotates the output terminal 35 of the motor 31. The output instruction from the control unit defines, for example, a rotation speed, a rotation direction, a rotation angle, and a rotation torque, based on detection values and instruction values from the torque sensor and the rotation angle sensor.

Subsequently, since the output terminal 35 having a square cross-section is fitted in the upper hole 40 also having a square cross-section, the joint member 34 connected to the output terminal 35 by the retaining pin 38 rotates in response to the rotation of the output terminal 35. The rotation speed, rotation direction, and rotation torque of the joint member 34 are the same as those of the output terminal 35 of the motor 31. Then, the rotation of the joint member 34 rotates the male threaded member 33. Since the driven rotary end 43 of the male threaded member 33, the driven rotary end 43 being hexagonal in cross section, is fitted in the lower hole 41 of the joint member 34, the lower hole 41 also being hexagonal in cross section, the rotation of the joint member 34 is transmitted to the male threaded member 33. Therefore, the rotation speed, rotation direction, and rotation torque of the driven rotary end 43 of the male threaded member 33 are the same as those of the joint member 34. Since the driven rotary end 43 of the male threaded member 33 is axially movable in the joint member 34, only the rotation is transmitted from the joint member 34 to the driven rotary end 43 of the male threaded member 33.

The rotation of the driven rotary end 43 then rotates the male thread portion 44 integrated therewith. This allows the male thread portion 44 to axially move upward or downward, depending on the rotation direction, relative to the female threaded member 32 secured to the upper frame 2. The distance of the axial movement of the male threaded member 33 is determined by the number of revolutions of the male threaded member 33 as well as the thread pitches of the female threaded member 32 and the male threaded member 33.

Subsequently, the rotation of the male thread portion 44 rotates the rotational/axial-movement-transmitting end 45 integrated therewith. At the same time, the upward or downward axial movement of the male thread portion 44 axially moves the rotational/axial-movement-transmitting end 45 upward or downward. That is, the rotation of the motor 31 transmits rotation torque and axial movement to the rotational/axial-movement-transmitting end 45. Thus, the rotation of the motor 31 not only rotates but also axially moves, relative to the upper frame 2, the rotational/axial-movement-transmitting end 45 of the male threaded member 33.

Structure of Rotor

Figure 4:
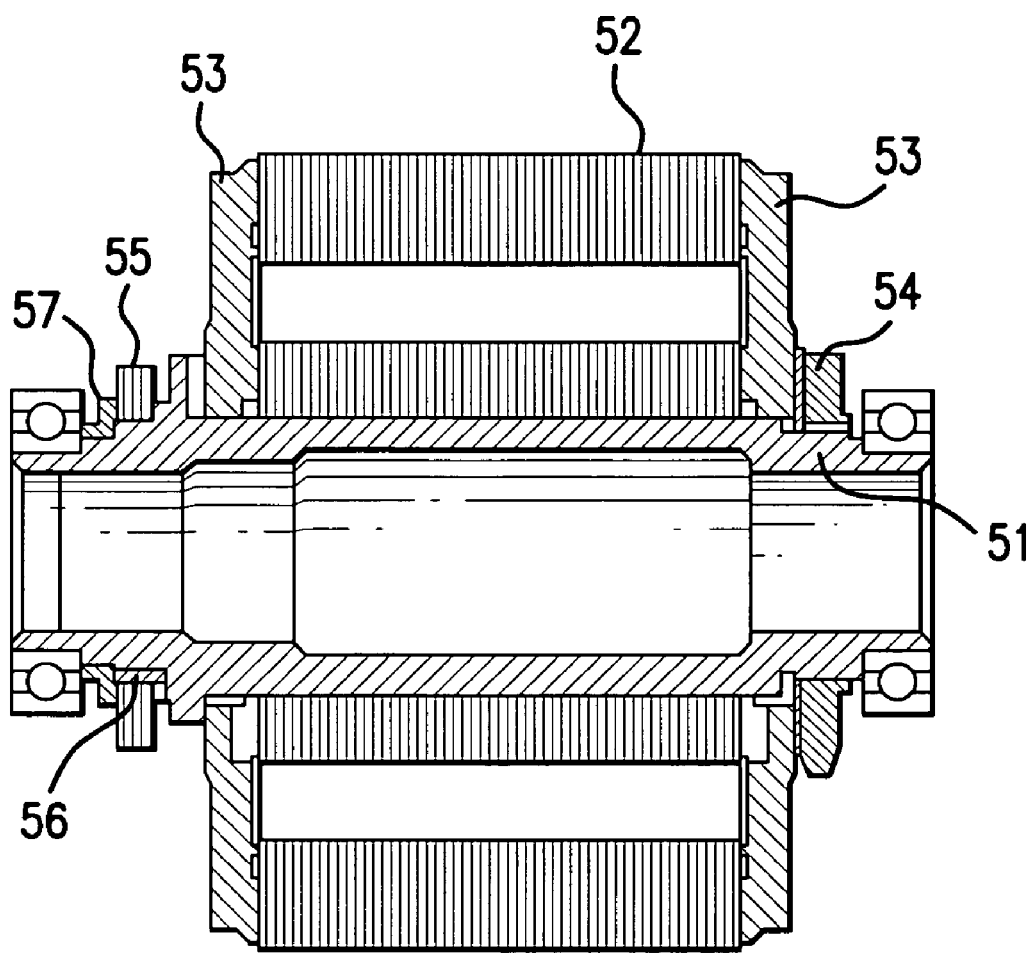
FIG. 4 is a cross-sectional view of a rotor of a motor to be assembled by the rotor assembly system.

A motor's rotor to be assembled by the rotor assembly system of the present embodiment, referring to FIG. 4, includes a rotor shaft (shaft) 51, a rotor core 52, retainers 53, a locknut 54, a resolver (rotational body) 55, a positioning key (key) 56, and a retaining plate (locking component) 57.

The rotor shaft 51 is substantially cylindrical. The outer surface of one end (right side in FIG. 4) of the rotor shaft 51 is provided with threads, while the outer surface of the other end (left side in FIG. 4) is provided with a plurality of steps in which the diameter of the shaft extends from the end. The rotor core 52 is made of laminated silicon steel plates and fitted on the outer surface of the rotor shaft 51. The retainers 53 are arranged at the respective axial ends of the rotor core 52 to hold the rotor core 52 from both sides. One side of the rotor core 52 is in contact with the stepped portion of the rotor shaft 51. The locknut 54 is arranged at the other side of the rotor core 52 with a washer provided therebetween. The locknut 54 has inner threads and is assembled with the threaded portion of the rotor shaft 51. The threaded portion of the locknut 54 and the threaded portion of the rotor shaft 51 are swaged together. The locknut 54 secures the rotor core 52 and the retainer 53 to the rotor shaft 51.

The resolver 55 is made of laminated silicon steel plates and constitutes a rotation angle sensor detecting the rotation angle of the rotor. The resolver 55 and the locknut 54 are located at opposite ends of the rotor shaft 51. The inner surface of the resolver 55 is provided with a key groove for positioning. The positioning key 56 is arranged in the key groove to determine the rotational position of the resolver 55 relative to the rotor shaft 51. The retaining plate 57 secures the resolver 55 and the positioning key 56 to the rotor shaft 51. That is, the inner surface of the retaining plate 57 is partially fitted with the rotor shaft 51, while one end face of the retaining plate 57 is in contact with the resolver 55 and the positioning key 56.

Rotor Assembly Tool

A rotor assembly tool will now be described. The rotor assembly tool T of the present embodiment is the threaded member assembling tool T1, the swaging tool T2, the key insertion tool T3, and the locking-component-mounting tool T4.

Threaded member assembling Tool

Figure 5:
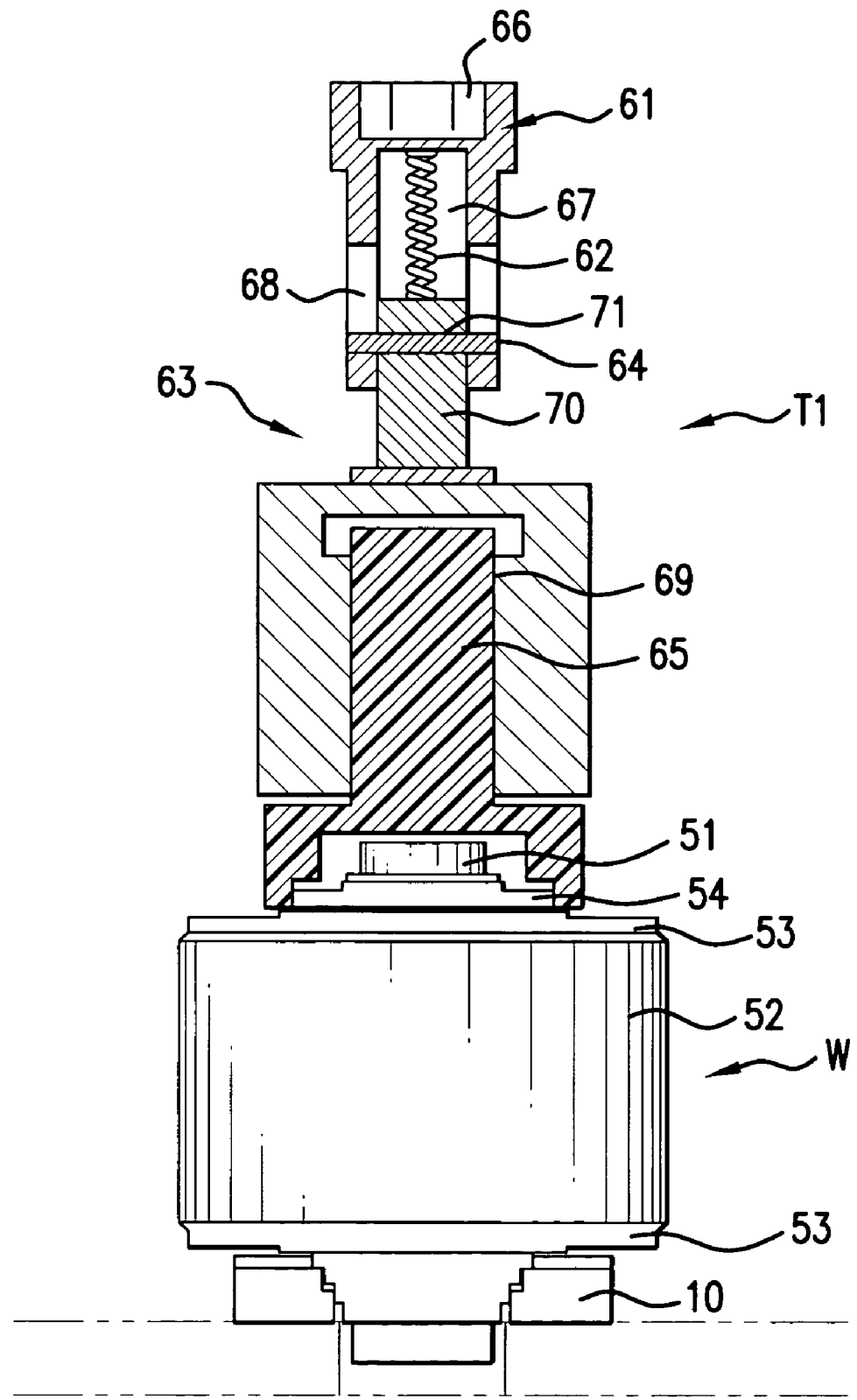
FIG. 5 shows a threaded member assembling tool.

The threaded member assembling tool T1 are described with reference to FIG. 5 illustrating the threaded member assembling tool T1, a rotor body constituting a workpiece W, and the chuck 10 securing the rotor body. Here, the rotor body to be processed by the threaded member assembling tool T1 is a rotor in which the rotor shaft 51 is provided with the rotor core 52 and the retainer 53. The threaded member assembling tool T1 is a tool capable of assembling the locknut 54 onto the threaded portion of the rotor shaft 51.

As shown in FIG. 5, the threaded member assembling tool T1 includes an engaging member 61, a spring 62, a rotation-transmitting member 63, a pin 64, and a gripping member 65. The engaging member 61 is a substantially columnar shaft in appearance. The upper end of the engaging member 61 is provided with a hexagonal-sectional hole 66 opening upward. The hexagonal-sectional hole 66 is fitted to the rotational/axial-movement-transmitting end 45 of the rotational/axial-movement-transmitting unit 12. Moreover, a square-sectional hole 67 opening downward is formed inside the engaging member 61. In the engaging member 61, sidewalls of the square-sectional hole 67 are provided with one or more vertical slots or elongated openings 68. The vertical length of the opening 68 is larger than that of the pin 64 (described below) such that the pin 64 is movable in the axial direction relative to the member 61. One end of the compression spring 62 engages the upper end face of the square-sectional hole 67 of the engaging member 61.

The rotation-transmitting member 63 has an opening 69 on the lower side, and a square-sectional shaft 70 on the upper side. The other end of the compression spring 62 engages the upper end face of the square-sectional shaft 70. The square-sectional shaft 70 is fitted in the square-sectional hole 67 of the engaging member 61. In addition, the square-sectional shaft 70 has a throughhole 71 in the direction orthogonal to the axis in which the pin 64 is secured.

The pin 64 is fitted in both the insertion hole 68 of the engaging member 61 and the throughhole 71 of the rotation-transmitting member 63. That is, the pin 64 connects the engaging member 61 and the rotation-transmitting member 63.

The gripping member 65 is substantially T-shaped in cross section and is shaped so as to grip the locknut 54. That is, the interior opening at the bottom end of the gripping member 65 is hexagonal in cross section or otherwise contoured for engaging the nut 54. The upper portion of the gripping member 65 is fitted in the opening 69 of the rotation-transmitting member 63. The opening 69 has, for example, a one-way clutch mechanism.

The operation of the threaded member assembling tool T1 used in the rotor assembly system will now be described. As described above, the rotation of the motor 31 transmits rotation torque and axial movement to the rotational/axial-movement-transmitting end 45 of the rotational/axial-movement-transmitting unit 12.

Since the rotational/axial-movement-transmitting end 45 is fitted in the engaging member 61 of the threaded member assembling tool T1, rotation torque and axial movement are transmitted to the engaging member 61. Then the rotation of the engaging member 61 rotates the rotation-transmitting member 63. In other words, the rotation of the engaging member 61 is transmitted to the rotation-transmitting member 63 because of the fit between the square-sectional hole 67 of the engaging member 61 and the square-sectional shaft 70 of the rotation-transmitting member 63. On the other hand, the axial movement of the rotation-transmitting member 63 does not necessarily follow the axial movement of the engaging member 61 since the elastic force of the spring 62 compensates for differences in the axial movement of the engaging member 61 and axial movement of the rotation-transmitting member 63 as the pin 64 vertically moves in the opening 68 of the engaging member 61. The rotation of the rotation-transmitting member 63 is then transmitted to the gripping member 65. As a result, the locknut 54 gripped by the gripping member 65 is rotated. Thus, the locknut 54 is assembled into the threaded portion of the rotor shaft 51.

Figure 10:
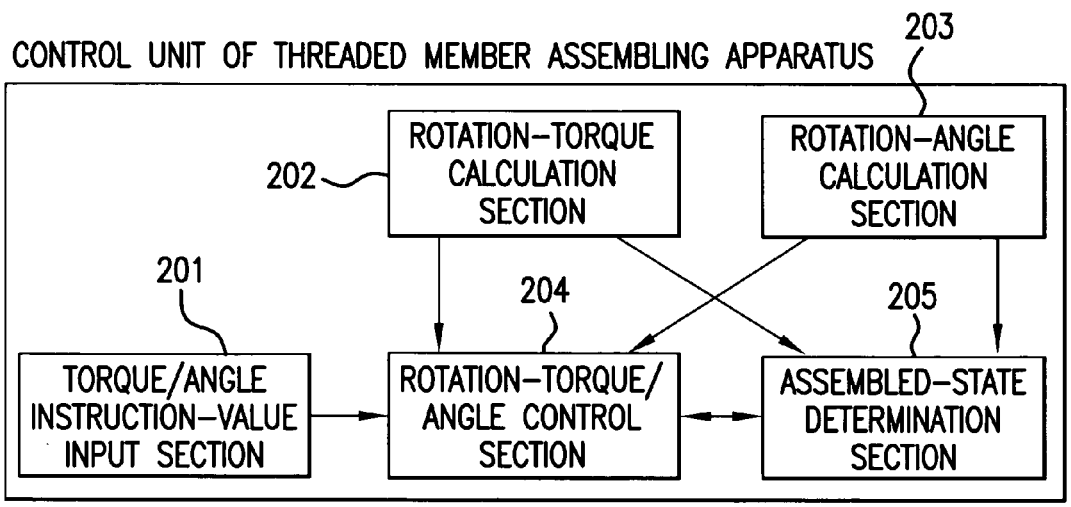
FIG. 10 is a block diagram showing a control unit of a threaded member assembling apparatus.

A control unit of a threaded member assembling apparatus, in which the threaded member assembling tool T1 is used in the rotor assembly system, will be described with reference to FIG. 10. The control unit of this threaded member assembling apparatus controls the motor 31 of the rotational/axial-movement-transmitting unit 12. As shown in FIG. 10, the control unit of the threaded member assembling apparatus includes a torque/angle instruction-value input section 201, a rotation-torque calculation section 202, a rotation-angle calculation section 203, a rotation-torque/angle control section 204, and a assembled-state determination section 205.

Instruction values of rotation torque and rotation angle of the motor 31 are input by the torque/angle instruction-value input section 201. The instruction value of rotation torque corresponds to torque in assembling the locknut 54 onto the threaded portion of the rotor shaft 51. The instruction values of the rotation angle correspond to, for example, a rotation speed of the locknut 54, and the angle of the locknut 54 assembled in and secured to the threaded portion of the rotor shaft 51.

The rotation-torque calculation section 202 calculates the actual rotation torque of the motor 31 based on the output signal from the torque sensor of the motor 31. The rotation-angle calculation section 203 calculates the rotation angle of the motor 31 based on the output signal from the rotation angle sensor of the motor 31.

The rotation-torque/angle control section 204 controls the rotation torque of the motor 31 based on the input torque instruction value and the calculated rotation torque, such that the rotation torque of the motor 31 and the input torque instruction value match. In addition, the rotation-torque/angle control section 204 controls the rotation angle of the motor 31 based on the input angle instruction value and the calculated rotation angle, such that the rotation angle of the motor 31 and the input angle instruction value match. Thus, the rotation speed can also be controlled. Moreover, the calculation of the rotation angle determines the distance of the axial movement of the rotational/axial-movement-transmitting unit 12. The rotation-torque/angle control section 204 terminates the controlling process when the assembled-state determination section 205 determines the completion of the threaded member assembling process, or the assembled state is determined to be abnormal.

The assembled-state determination section 205 determines the completion of the threaded member assembling process and the abnormality of the threaded member assembling state. Specifically, the assembled-state determination section 205 determines whether the actual rotation torque of the motor 31 reaches the end-of-assembling torque of the locknut 54, and whether the distance of the axial movement of the rotational/axial-movement-transmitting unit 12 calculated based on the rotation angle of the motor 31 reaches a predetermined value, thereby determining successful completion of the threaded member assembling process. The threaded member assembling state is determined to be abnormal if the actual rotation torque of the motor 31 has reached the end-of-assembling torque of the locknut 54 while the distance of the axial movement of the rotational/axial-movement-transmitting unit 12 calculated based on the rotation angle of the motor 31 has not yet reached a predetermined value.

Swaging Tool

Figure 6:
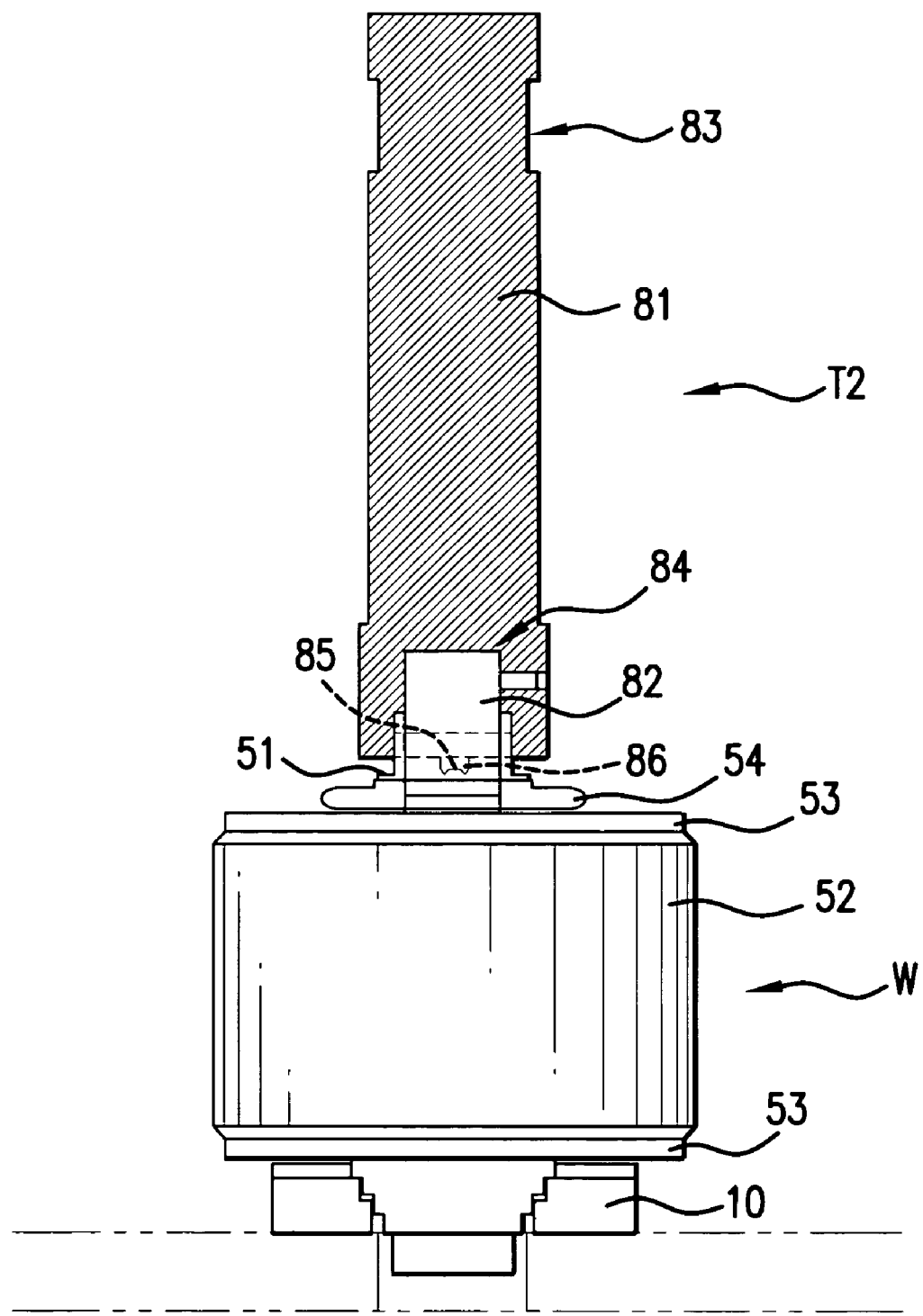
FIG. 6 shows a swaging tool.
Figure 7:
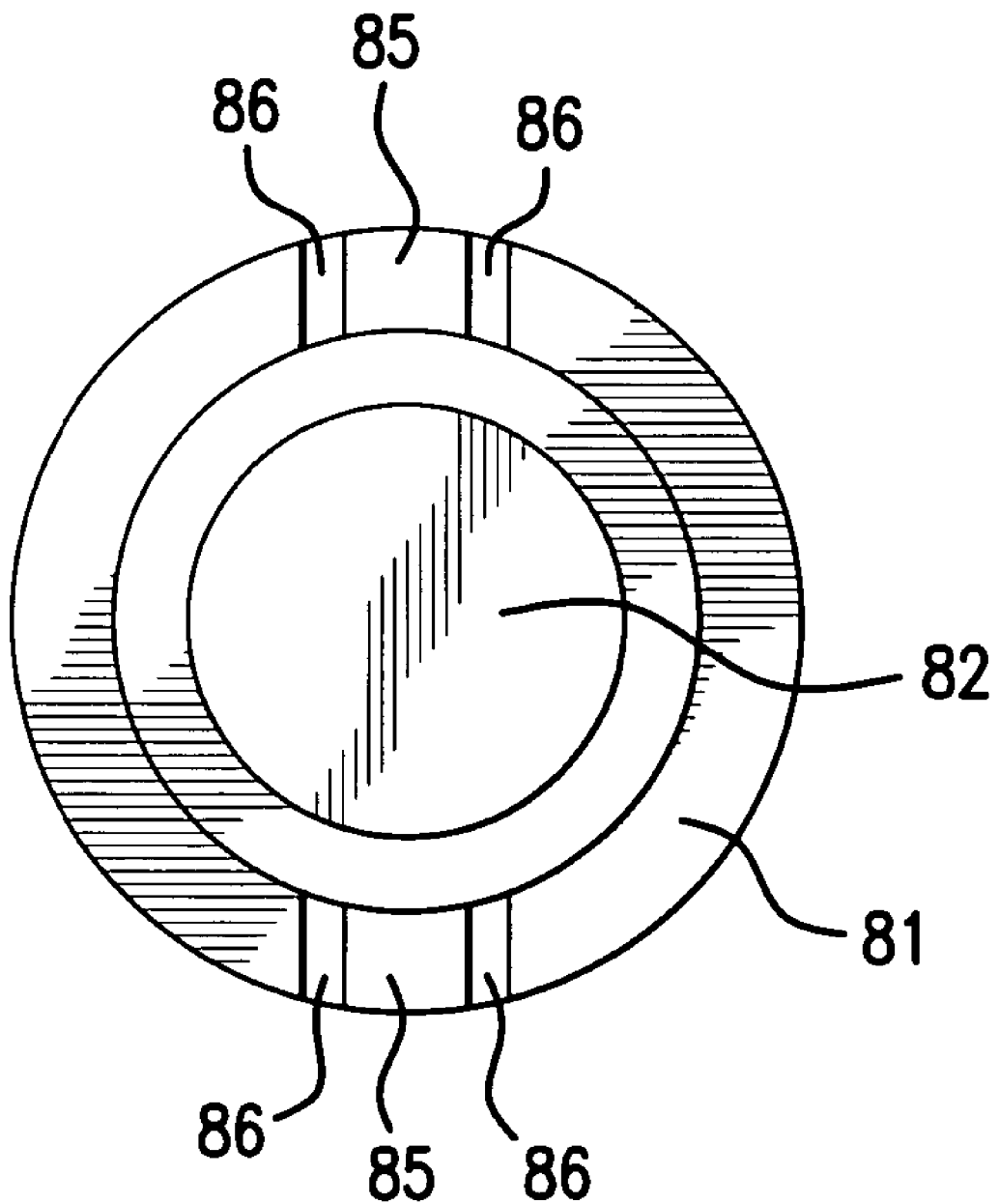
FIG. 7 is a bottom view of the swaging tool.

FIG. 6 illustrates the swaging tool T2, a rotor body constituting a workpiece W, and the chucks 10 securing the rotor body. Here, the rotor body to be processed by the swaging tool T2 is a rotor in which the rotor shaft 51 is provided with the rotor core 52, the retainer 53, and the locknut 54. The swaging tool T2 is a tool capable of swaging the threaded portion of the rotor shaft 51 and the threaded portion of the locknut 54. FIG. 7 shows the undersurface of the swaging tool T2.

As shown in FIG. 6, the swaging tool T2 includes an engaging/swaging member 81 and an axis-positioning member 82. The engaging/swaging member 81 is a shaft substantially columnar in shape. The lower end of the above-described rotational/axial-movement-transmitting end 45 of the rotational/axial-movement-transmitting unit 12 is in contact with the upper end face of the engaging/swaging member 81. The outer surface of the upper portion of the engaging/swaging member 81 is provided with a pair of flat opposing surfaces 83 where the engaging/swaging member 81 is substantially oval in cross section and fitted in the U-shaped tool-rotation-locking member 13. The axial length of the opposing surfaces 83 is larger than the axial thickness of the tool-rotation-locking member 13. Rotation of the engaging/swaging member 81 is prevented by the tool-rotation-locking member 13 engaging the opposing surfaces 83 of the engaging/swaging member 81 while axial movement of the engaging/swaging member 81 is permitted within the axially movable range of the opposing surfaces 83 in the tool-rotation-locking member 13.

As shown in FIGS. 6 and 7, the lower end of the engaging/swaging member 81 is provided with a diameter-contracting stepped hole 84 in which the diameter contracts from the lower end. The ring-shaped lowest end of the engaging/swaging member 81 has a pair of protrusions 85 opposed in the direction of the diameter centered on the shaft center. The lower end of each protrusion 85 has two small protrusions 86 protruding in the direction of the diameter. Each small protrusion 86 of the engaging/swaging member 81 is located slightly outside the threaded portion of the locknut 54. That is, the small protrusions 86 are located at the slightly protruding portion of the upper surface of the locknut 54.

The axis-positioning member 82 is substantially columnar. One end of the axis-positioning member 82 is fitted in the upper portion of the diameter-contracting stepped hole 84 formed at the lower end of the engaging/swaging member 81. The other end of the axis-positioning member 82 is arranged in the central axial hole of the rotor shaft 51 of the rotor body constituting the workpiece W for determining the position of the swaging tool T2.

The operation of the swaging tool T2 used in the rotor assembly system will now be described. As described above, the rotation of the motor 31 transmits rotation torque and axial movement to the rotational/axial-movement-transmitting end 45 of the rotational/axial-movement-transmitting unit 12.

Since the lower end of the rotational/axial-movement-transmitting end 45 is in contact with the upper end of the engaging/swaging member 81 of the swaging tool T2, only the downward axial movement is transmitted to the engaging/swaging member 81. The rotation of the engaging/swaging member 81 is securely-locked by the tool-rotation-locking member 13. Then, the downward axial movement of the engaging/swaging member 81 allows the axis-positioning member 82 to be inserted into the central axial hole of the rotor shaft 51, thereby allowing the swaging tool T2 to be positioned. Subsequently, a further downward axial movement of the engaging/swaging member 81 brings the small protrusions 86 into contact with the exterior of the threaded portion of the locknut 54. Specifically, the small protrusions 86 partially come into contact with the slight upper protrusion of the locknut 54. Then, a further downward axial movement of the engaging/swaging member 81 allows the small protrusions 86 to press and deform the exterior of the locknut 54. Thus, the slight upper protrusion of the locknut 54 is deformed toward the threaded side of the locknut 54 to swage the threaded portion of the rotor shaft 51 and the threaded portion of the locknut 54 together. A further downward axial movement of the engaging/swaging member 81 allows the threaded portion of the rotor shaft 51 and the threaded portion of the locknut 54 to be securely swaged.

Figure 11:
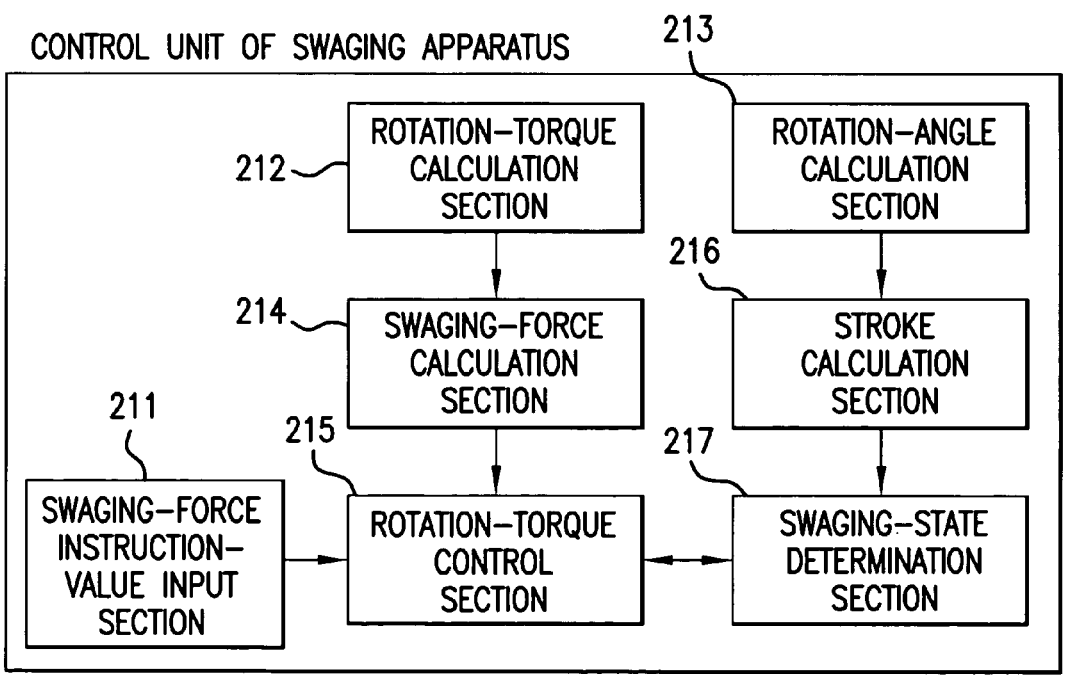
FIG. 11 is a block diagram showing a control unit of a swaging apparatus.

A control unit of a swaging apparatus, in which the swaging tool T2 is used in the rotor assembly system, will be described with reference to FIG. 11. The control unit of this swaging apparatus controls the motor 31 of the rotational/axial-movement-transmitting unit 12. As shown in FIG. 11, the control unit of the swaging apparatus includes a swaging-force instruction-value input section 211, a rotation-torque calculation section 212, a rotation-angle calculation section 213, a swaging-force calculation section 214, a rotation-torque control section 215, a stroke calculation section 216, and a swaging-state determination section 217.

An instruction value of the swaging force to be applied, by the swaging tool T2, for swaging the threaded portion of the rotor shaft 51 and the threaded portion of the locknut 54 is input by the swaging-force instruction-value input section 211. This instruction value of the swaging force corresponds to a pressing force to be applied, by the swaging tool T2, to the locknut 54. The rotation-torque calculation section 212 calculates the actual rotation torque of the motor 31 based on the output signal from the torque sensor of the motor 31. The rotation-angle calculation section 213 calculates the rotation angle of the motor 31 based on the output signal from the rotation angle sensor of the motor 31.

The swaging-force calculation section 214 calculates, based on the rotation torque calculated by the rotation-torque calculation section 212, a swaging force corresponding to the axial pressing force of the swaging tool T2. The rotation-torque control section 215 controls the rotation torque of the motor 31, based on the input swaging-force instruction value and the calculated actual swaging force, such that the actual swaging force and the swaging-force instruction value match.

The stroke calculation section 216 calculates a stroke, which is a distance of the axial movement of the swaging tool T2, based on the rotation angle of the motor 31 calculated by the rotation-angle calculation section 213. The swaging-state determination section 217 determines, based on the stroke which is a distance of the axial movement of the swaging tool T2, that the swaging state is normal when the amount of stroke reaches a predetermined value. On the other hand, the swaging state is determined to be abnormal when the amount of stroke does not reach a predetermined value. If, for example, the swaging force is insufficient when the swaging state is determined to be abnormal, an additional swaging force is applied. If, even in this case, the swaging state is still abnormal, the occurrence of other abnormalities is assumed and the swaging state is determined to be faulty.

Key Insertion Tool

Figure 8:
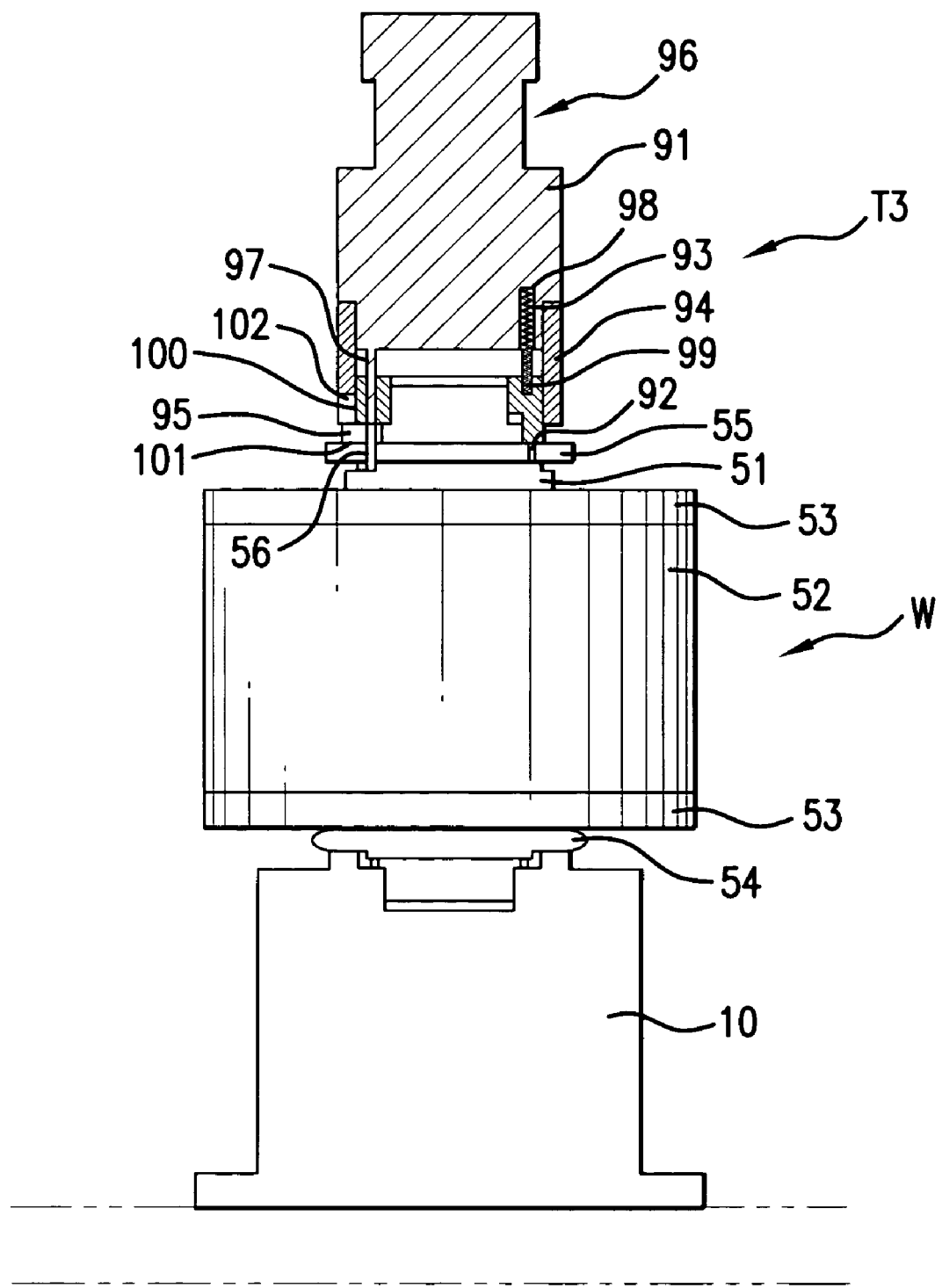
FIG. 8 shows a key insertion tool.

The key insertion tool T3 will now be described with reference to FIG. 8. FIG. 8 illustrates the key insertion tool T3, a rotor body constituting a workpiece W, and the chuck 10 securing the rotor body. Here, the rotor body to be processed by the key insertion tool T3 is a rotor in which the rotor shaft 51 is provided with the rotor core 52, the retainer 53, the locknut 54, and the resolver 55. The key insertion tool T3 is a tool capable of pressing the positioning key 56 in the opening formed by the key grooves of the rotor shaft 51 and the resolver 55.

As shown in FIG. 8, the key insertion tool T3 includes an engaging member 91, an axis-positioning member 92, a compression spring 93, an outer-ring retainer 94, and a key retainer 95. The engaging member 91 is a shaft substantially columnar in shape. The lower end of the above-described rotational/axial-movement-transmitting end 45 of the rotational/axial-movement-transmitting unit 12 is in contact with the upper end face of the engaging member 91. The outer surface of the upper portion of the engaging member 91 is provided with a pair of flat opposing surfaces 96 to form a substantial oval cross sectioned portion of the member 91 retained against rotation in the U-shaped tool-rotation-locking member 13 described above. The axial length of the opposing surfaces 96 is larger than the axial thickness of the tool-rotation-locking member 13 to permit limited axial sliding movement of the engaging member 91. Thus the engaging member 91 is secured to the first flange 23 by the tool-rotation-locking member 13, is prevented from rotating by the opposing surfaces 96 of the engaging member 91 and is axially moveable within the range determined by the difference in axial length of the tool-rotation-locking member 13 and the opposing surfaces 96.

The lower end of the engaging member 91 is provided with a rod 97 extending downward from an eccentric position of the engaging member 91. The shape of the under surface of the extending rod 97 is designed to press the upper surface of the positioning key 56. The engaging member 91 has a stepped portion in which the diameter contracts axially toward the lower position. Moreover, a spring insertion hole 98 is formed on the lower end face of the engaging member 91. The spring 93 is disposed in the spring insertion hole 98 with one end of the spring 93 secured to the upper end of the spring insertion hole 98.

The axis-positioning member 92 is substantially cylindrical with a central throughhole and has a spring insertion hole 99 and a key-insertion throughhole 100 that are disposed remote from the axis of the axis-positioning member 92. The shape of the central throughhole of the axis-positioning member 92 is designed to fit the exterior of the rotor shaft 51. The spring 93 is disposed in the spring insertion hole 99 and the lower end of the spring 93 is secured to the lower end of the spring insertion hole 99. The extending rod 97 of the engaging member 91 extends downward into the key-insertion throughhole 100 wherein the positioning key 56 is placed. The axis-positioning member 92 has a key-retainer throughhole 101 extending from the exterior to the key-insertion throughhole 100. The key retainer 95 is secured in the key-retainer throughhole 101 for holding the positioning key 56 in the key-insertion throughhole 100 with a slight pressing force.

The outer-ring retainer 94 has a substantially cylindrical shape that fits with the diameter-contracting stepped portion of the engaging member 91. The axis-positioning member 92 is axially slidable within the outer-ring retainer 94. The outer-ring retainer 94 not only serves as a guide for the axial movement of the engaging member 91 relative to the axis-positioning member 92, but also determines the insertion position of the positioning key 56. Moreover, the outer-ring retainer 94 has a notch 102 at the lower end. The notch 102 prevents the key retainer 95 from interfering with the outer-ring retainer 94 when the axis-positioning member 92 and the outer-ring retainer 94 relatively move in the axial direction. Partial insertion of the positioning key 56 into the opening formed by aligned key grooves in the rotor shaft and the resolver and into the key insertion throughhole 100 provide proper alignment of the rotor relative to the pressing tool T3.

The operation of the key insertion tool T3 used in the rotor assembly system will now be described. As described above, the rotation of the motor 31 transmits rotation torque and axial movement to the rotational/axial-movement-transmitting end 45 of the rotational/axial-movement-transmitting unit 12.

Since the lower end of the rotational/axial-movement-transmitting end 45 is in contact with the upper end of the engaging member 91 of the key insertion tool T3, only the downward axial movement is transmitted to the engaging member 91. The rotation of the engaging member 91 is prevented by the tool-rotation-locking member 13. First, the key insertion tool T3 is arranged such that the axis-positioning member 92 comes into contact with the resolver 55. That is, the central throughhole of the axis-positioning member 92 is fitted with the exterior of the rotor shaft 51 to determine the position of the axis-positioning member 92. Here, the positioning key 56 has not yet come into contact with either the end face of the rotor shaft 51 or the lower end of the extending rod 97 of the engaging member 91.

Subsequently, the engaging member 91 axially moves downward relative to the axis-positioning member 92. This forces the extending rod 97 of the engaging member 91 further into the key-insertion throughhole 100 of the axis-positioning member 92 whereupon the lower end of the extending rod 97 comes into contact with the upper end of the positioning key 56.

Further axial downward movement of the engaging member 91 and the extending rod 97 presses the upper end of the positioning key 56 downward from the key-insertion throughhole 100 and the key retainer 95 into the key grooves of the resolver 55 and rotor shaft 51 until the lower end of the positioning key 56 comes into contact with the end face of the rotor shaft 51.

Figure 12:
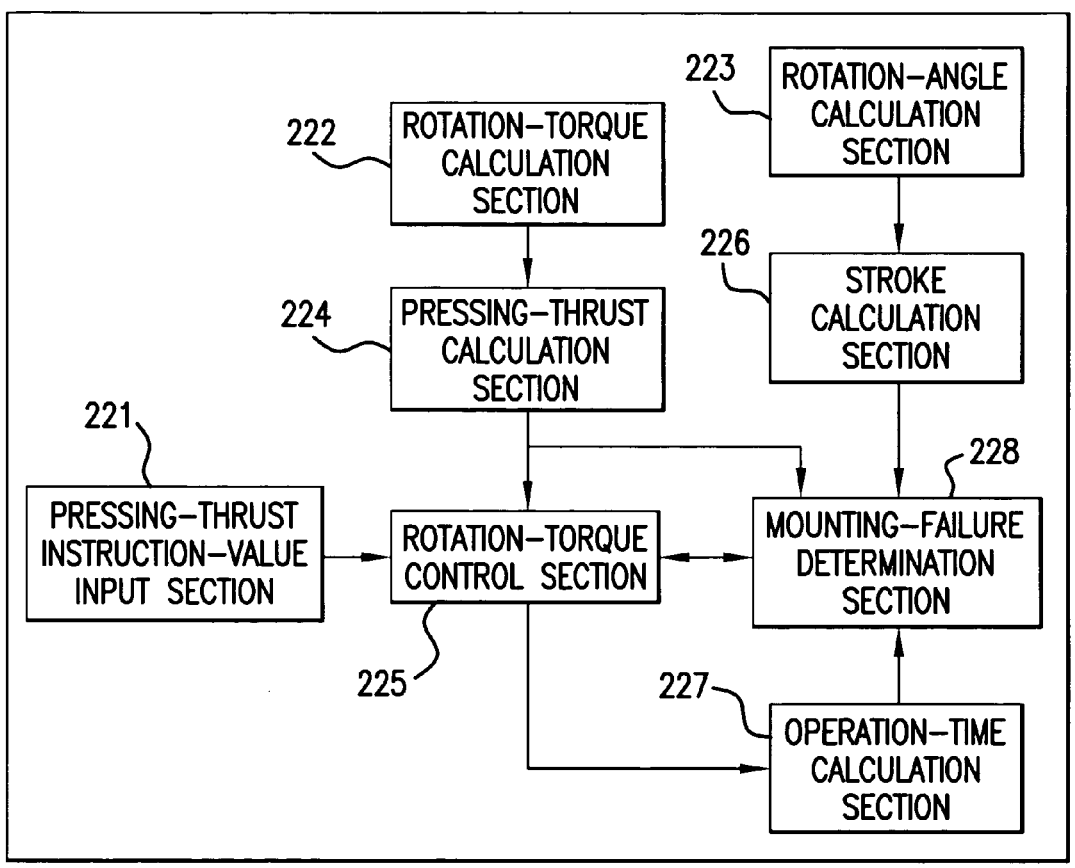
FIG. 12 is a block diagram showing a control unit of a pressing apparatus.

A control unit of a key insertion apparatus (pressing apparatus), in which the key insertion tool T3 is used in the rotor assembly system, will be described with reference to FIG. 12. FIG. 12 is a block diagram showing the control unit of the key insertion apparatus. As shown in FIG. 12, the control unit of the key insertion apparatus includes a pressing-thrust instruction-value input section 221, a rotation-torque calculation section 222, a rotation-angle calculation section 223, a pressing-thrust calculation section 224, a rotation-torque control section 225, a stroke calculation section 226, an operation-time calculation section 227, and a mounting-failure determination section 228.

Instruction values of a pressing thrust (pressing force) to be applied when the key insertion tool T3 presses the positioning key 56 into the key groove of the resolver 55 are input in the pressing-thrust instruction-value input section 221. Instruction values of two types of pressing thrusts, that is, a high pressing thrust and a low pressing thrust are inputted as described below. The rotation-torque calculation section 222 calculates the actual rotation torque of the motor 31 based on the output signal from the torque sensor of the motor 31. The rotation-angle calculation section 223 calculates the rotation angle of the motor 31 based on the output signal from the rotation angle sensor of the motor 31.

The pressing-thrust calculation section 224 calculates, based on the rotation torque of the motor 31 calculated by the rotation-torque calculation section 222, a pressing thrust corresponding to the axial pressing force of the key insertion tool T3. The rotation-torque control section 225 controls the rotation torque of the motor 31, based on the input pressing-thrust instruction-value and the calculated actual pressing thrust, such that the actual pressing thrust and the pressing-thrust instruction-value match. That is, when the pressing-thrust instruction-value is a low pressing-thrust instruction-value, the rotation-torque control section 225 controls the rotation torque of the motor 31 such that the actual pressing thrust and the low pressing-thrust instruction-value match. On the other hand, when the pressing-thrust instruction-value is a high pressing-thrust instruction-value, the rotation-torque control section 225 controls the rotation torque of the motor 31 such that the actual pressing thrust and the high pressing-thrust instruction-value match.

The stroke calculation section 226 calculates a stroke, which is a distance of the axial movement of the key insertion tool T3, based on the rotation angle of the motor 31 calculated by the rotation-angle calculation section 223. The operation-time calculation section 227 calculates the operation time during which the rotation-torque control section 225 controls the motor 31.

Figure 13:
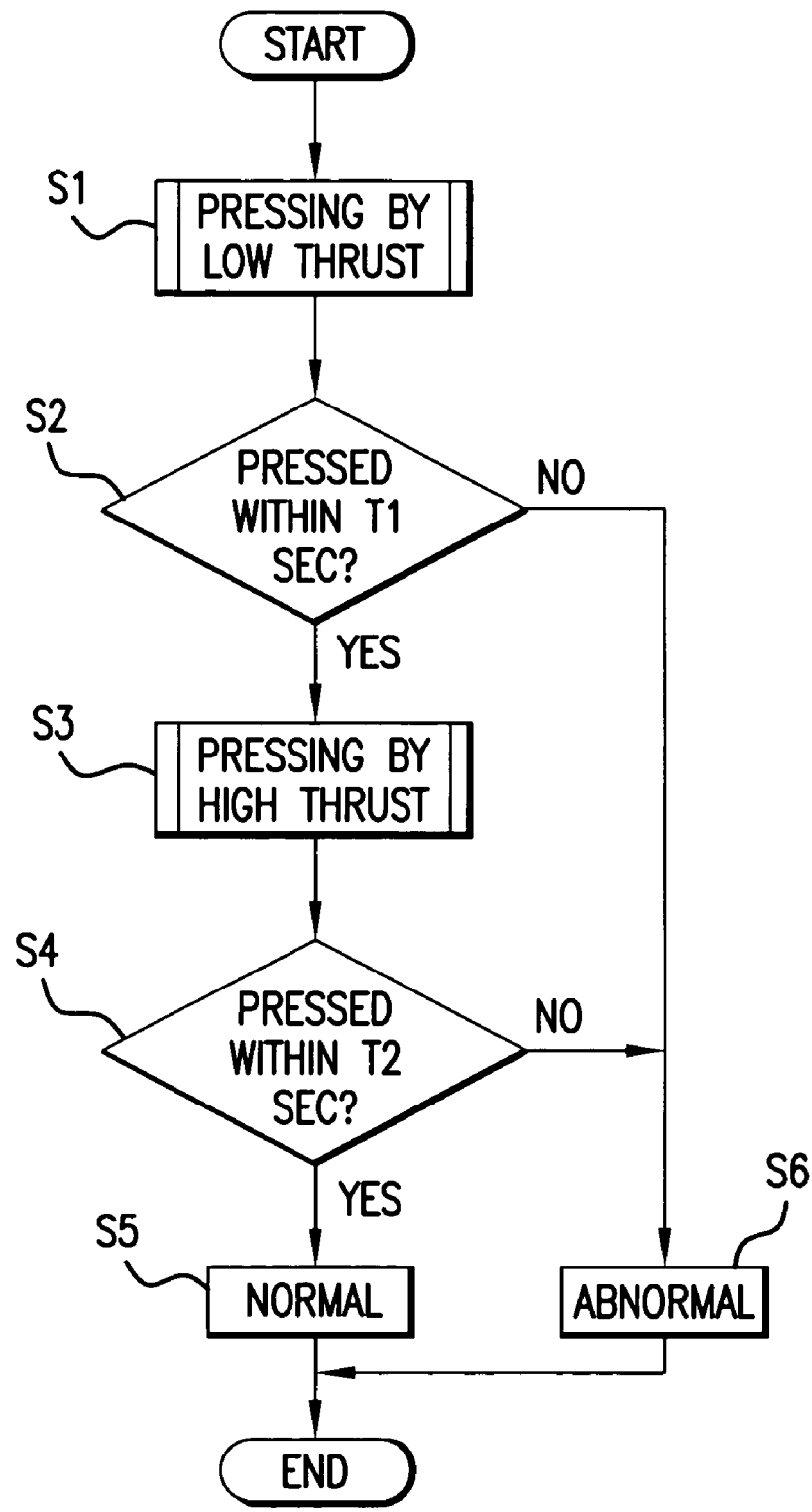
FIG. 13 is a flowchart showing processes in the control unit of the pressing apparatus.

The mounting-failure determination section 228 determines, based on the pressing thrust as well as the stroke, which is a distance of the axial movement of the key insertion tool T3, whether the positioning key 56 is pressed into the key groove of the resolver 55 with an appropriate pressing thrust. During normal assembly, a low-pressing thrust will not force the key 56 into the key grooves of the rotor shaft 51 and the resolver 55, but a high-pressing thrust will completely force the key into the grooves. Processes in the mounting-failure determination section 228 will be described with reference to FIG. 13.

First, a pressing process with a low pressing thrust is performed in the rotation-torque control section 225 in response to a low pressing-thrust instruction-value input in the pressing-thrust instruction-value input section 221 (step S1). That is, a rotation torque is controlled such that an actual pressing thrust and the low pressing-thrust instruction-value match. Here, the low pressing thrust is, for example, 50 N. Subsequently, the mounting-failure determination section 228 determines whether the positioning key 56 is inserted into the key groove of the resolver 55 within time T1 (for example, 2 seconds) (step S2). This determination is made based on the stroke, which is a distance of the axial movement of the key insertion tool T3. When the stroke has reached a first predetermined value, it is determined that the positioning key 56 has been inserted into the key groove of the resolver 55. On the other hand, when the stroke of the key insertion tool T3 has not reached the first predetermined value in time T1, it is determined that the positioning key 56 has not been advanced into the key groove of the resolver 55 within time T1. Whether time T1 has passed or not can be determined based on the time calculated by the operation-time calculation section 227.

If it is determined that the positioning key 56 is advanced by the first predetermined distance or more into the key grooves of rotor shaft 51 and the resolver 55 within time T1 (step S2: No), the mounting-failure determination section 228 determines that the mounting state of the positioning key 56 is abnormal (step S6). Since the positioning key 56 is advanced with a low force in this case, failure or abnormal operation of the insertion of the positioning key 56 is indicated.

When the positioning key 56 is not advanced by the first predetermined distance into the key groove of the resolver 55 within time T1 (step S2: Yes), a pressing process with a high pressing thrust is performed in the rotation-torque control section 225 in response to a high pressing-thrust instruction-value inputted in the pressing-thrust instruction-value input section 221 (step S3). That is, a rotation torque is controlled such that an actual pressing thrust and the high pressing-thrust instruction-value match. Here, the high pressing thrust is, for example, 1 kN. Subsequently, the mounting-failure determination section 228 determines whether the positioning key 56 is completely inserted into the key groove of the resolver 55 within time T2 (for example, 2 seconds) (step S4). This determination is made based on the stroke, which is a distance of the axial movement of the key insertion tool T3. When the stroke has reached a second predetermined value, it is determined that the positioning key 56 has been inserted into the key groove of the resolver 55. On the other hand, when the stroke of the key insertion tool T3 has not reached the second predetermined value in time T2, it is determined that the positioning key 56 has not been inserted into the key groove of the resolver 55 within time T2. Whether time T2 has passed or not can be determined based on the time calculated by the operation-time calculation section 227.

If it is determined that the positioning key 56 is not inserted into the key groove of the resolver 55 within time T2 (step S4: No), the mounting-failure determination section 228 determines that the mounting state of the positioning key 56 is abnormal (step S6). That is, the positioning key 56 cannot be inserted into the key groove of the resolver 55 within time T2 even by a high pressing thrust. In this case, the positioning key 56 cannot be inserted without being pressed by an excessive force which might damage the positioning key 56 and the key groove of the resolver 55.

When it is determined that the positioning key 56 is inserted into the key groove of the resolver 55 within time T2 (step S4: Yes), the mounting-failure determination section 228 determines that the mounting state of the positioning key 56 is normal (step S5). That is, the normal mounting state is that the positioning key 56 is inserted by the first predetermined distance within time T1 by a low pressing thrust and is inserted completely within time T2 by a high pressing thrust.

Locking-component-mounting Tool

The locking-component-mounting tool T4 will now be described with reference to FIG. 9 which shows a rotor body constituting a workpiece W, and the chucks 10 securing the rotor body. Here, the rotor body to be processed by the locking-component-mounting tool T4 is a rotor in which the rotor shaft 51 is provided with the rotor core 52, the retainer 53, the locknut 54, the resolver 55, and the positioning key 56. The locking-component-mounting tool T4 is a tool capable of mounting the retaining plate (locking component) 57.

Figure 9:
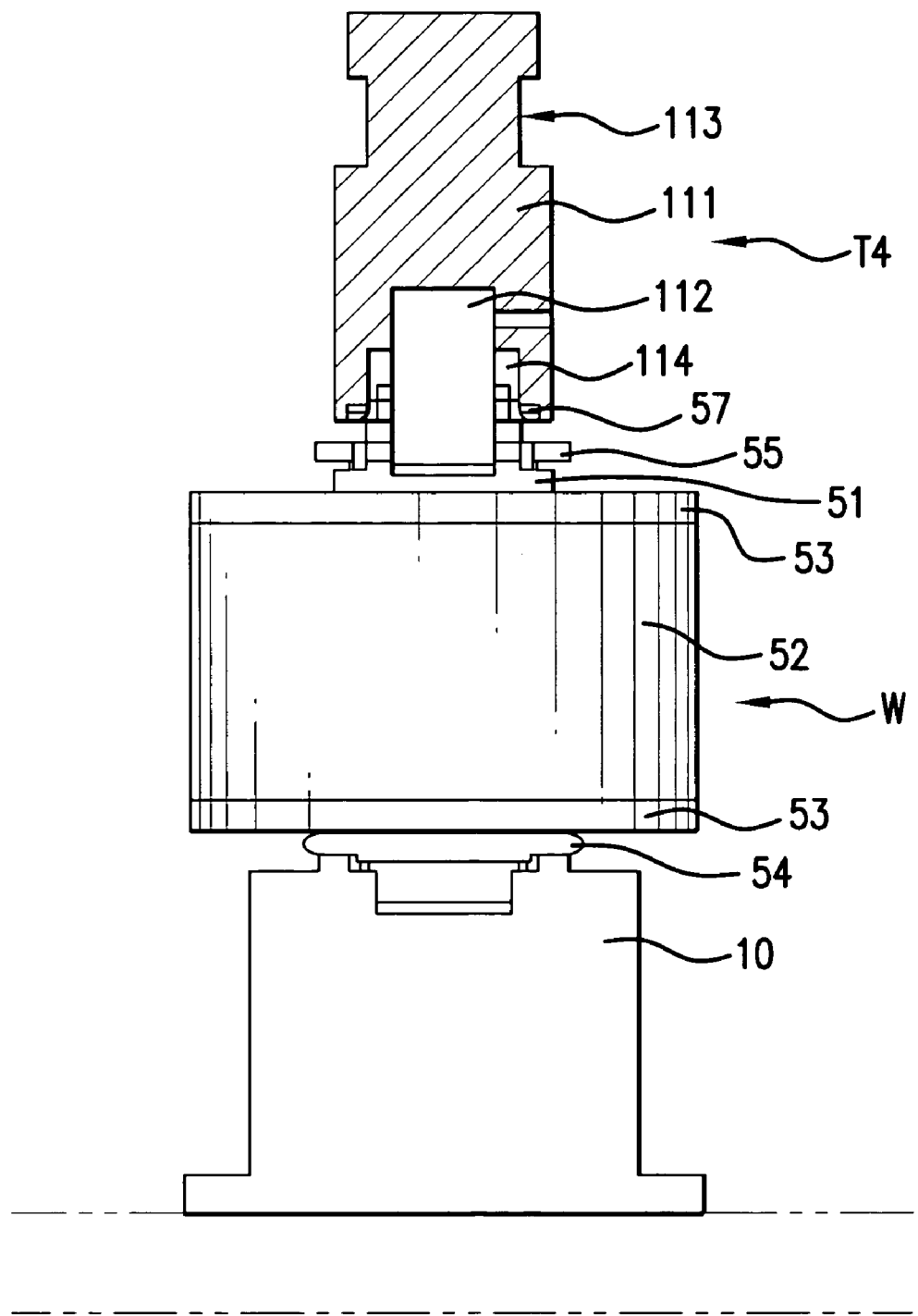
FIG. 9 shows a locking-component-mounting tool.

As shown in FIG. 9, the locking-component-mounting tool T4 includes an engaging/gripping member 111 and an axis-positioning member 112. The engaging/gripping member 111 is a shaft substantially columnar in shape. The lower end of the above-described rotational/axial-movement-transmitting end 45 of the rotational/axial-movement-transmitting unit 12 is in contact with the upper end face of the engaging/gripping member 111. The outer surface of the upper portion of the engaging/gripping member 111 is provided with a pair of flat opposing surfaces 113 to provide the engaging/gripping member 111 with a substantially in cross section secured by the U-shaped tool-rotation-locking member 13 for vertical sliding movement while preventing rotation of the engaging/gripping member 111. The axial length of the opposing surfaces 113 is larger than the axial thickness of the tool-rotation-locking member 13 so as to determine the axially movable range or limits of movement of the engaging/gripping member 111 in tool-rotation-locking member 13.

The lower end of the engaging/gripping member 111 is provided with a diameter-contracting stepped hole 114 in which the diameter contracts from the lower end. The column-shaped axis-positioning member 112 is fitted in the upper end portion of the diameter-contracting stepped hole 114. The lower end of the axis-positioning member 112 is arranged in the central axial hole of the rotor shaft 51 of the rotor body constituting the workpiece W and determines the position of the locking-component-mounting tool T4. The lower enlarged end portion of the diameter-contracting stepped hole 114 grips the exterior of the retaining plate 57 to be mounted on the rotor body constituting the workpiece W.

The operation of the locking-component-mounting tool T4 used in the rotor assembly system will now be described. As described above, the rotation of the motor 31 transmits rotation torque and axial movement to the rotational/axial-movement-transmitting end 45 of the rotational/axial-movement-transmitting unit 12.

Since the lower end of the rotational/axial-movement-transmitting end 45 is in contact with the upper end of the engaging/gripping member 111 of the locking-component-mounting tool T4, only the downward axial movement is transmitted to the engaging/gripping member 111. Moreover, the rotation of the engaging/gripping member 111 is securely locked by the tool-rotation-locking member 13. The downward axial movement of the engaging/gripping member 111 then allows the axis-positioning member 112 to be inserted into the central axial hole of the rotor shaft 51. Thus, the position of the locking-component-mounting tool T4 is determined. Subsequently, a further downward axial movement of the engaging/gripping member 111 allows the inner surface of the retaining plate 57 to engage the rotor shaft 51. A further downward axial movement of the engaging/gripping member 111 presses the retaining plate 57 onto the rotor shaft 51, and then allows the lower end of the retaining plate 57 to come into contact with the resolver 55. Thus, the resolver 55 and the positioning key 56 are securely fixed to the rotor shaft 51.

A control unit of a locking-member mounting assembly (pressing apparatus) in which the locking-component-mounting tool T4 is used in the rotor assembly system, will not be described here, since it is the same as the control unit of the key insertion apparatus described above.

What is claimed is:

1. A rotational/axial-movement-transmitting unit comprising:
    a frame;
    a rotary drive apparatus held by the frame and having an output terminal;
    a female threaded member fixed against movement relative to the frame;
    a male threaded member assembled in the female threaded member, the male threaded member having a rotational/axial-movement-transmitting end at one end, and having a driven rotary end at the other end; and
    joint means connecting the output terminal to the driven rotary end for transmitting rotation torque from the output terminal to the driven rotary end and for allowing axial movement of the male threaded member relative to the rotary drive apparatus.

2. The rotational/axial-movement-transmitting unit according to claim 1, wherein the rotary drive apparatus is a motor having a torque sensor and/or a rotation angle sensor.

3. The rotational/axial-movement-transmitting unit according to claim 1, wherein
the driven rotary end is a shaft end having a polygonal cross-section; and
one end of the joint means is provided with a hole in which the driven rotary end is fitted, the hole having a polygonal cross-section mating with the shaft end.

4. The rotational/axial-movement-transmitting unit according to claim 1, wherein
the driven rotary end has a hole having a polygonal cross-section; and
one end of the joint means is a shaft fitted in the driven rotary end, the shaft having a polygonal cross-section.

5. A threaded member assembling apparatus comprising:
(a) a base holding a workpiece having a threaded portion to be assembled with a threaded member;
(b) the rotational/axial-movement-transmitting unit according to claim 1; and
(c) a threaded member assembling tool comprising
a gripping member at one end and an engaging member at the other end,
the gripping member gripping the threaded member such that the threaded member can be attached and removed; and
the engaging member engaging with the rotational/axial-movement-transmitting end, and compensating for the axial movement of the rotational/axial-movement-transmitting unit while transmitting the rotation torque of the rotational/axial-movement-transmitting unit.

6. The threaded member assembling apparatus according to claim 5, wherein the rotary drive apparatus is a motor having a torque sensor and/or a rotation angle sensor.

7. The threaded member assembling apparatus according to claim 5, wherein the rotary drive apparatus is a motor having a torque sensor and a rotation angle sensor, the threaded member assembling apparatus further comprising:
a control unit controlling the motor, the control unit comprising:
rotation-torque calculation means calculating the rotation torque of the threaded member assembling tool based on a detection signal from the torque sensor;
rotation-angle calculation means calculating the rotation angle of the threaded member assembling tool based on a detection signal from the rotation angle sensor; and
assembled-state determination means determining the threaded member assembling state between the nut or the bolt and the threaded portion of the workpiece, based on the rotation torque calculated by the rotation-torque calculation means and the rotation angle calculated by the rotation-angle calculation means.

8. A swaging apparatus comprising:
(a) a base holding a workpiece having a threaded portion assembled with a threaded member;
(b) the rotational/axial-movement-transmitting unit according to claim 1 secured to the side remote from the threaded portion of the workpiece secured to the base; and
(c) a swaging tool comprising a swaging portion at one end and an engaging portion at the other end,
the swaging portion being in contact with a part of the threaded member to swage the threaded member to the threaded portion; and
the engaging portion engaging with the rotational/axial-movement-transmitting end of the male threaded member to transmit the axial movement of the rotational/axial-movement-transmitting unit.

9. The swaging apparatus according to claim 8, wherein the rotary drive apparatus is a motor having a torque sensor, the swaging apparatus further comprising:
a control unit controlling the motor, the control unit comprising:
swaging-force instruction-value input means for inputting a swaging-force instruction-value of the swaging tool;
swaging-force calculation means calculating a swaging force of the swaging tool based on a detection signal from the torque sensor; and
rotation-torque control means controlling the rotation torque of the motor based on the swaging-force instruction-value and the swaging force.

10. The swaging apparatus according to claim 8, wherein the rotary drive apparatus is a motor having a rotation angle sensor, the swaging apparatus further comprising:
a control unit controlling the motor, the control unit comprising:
stroke calculation means calculating a stroke of the swaging tool based on a detection signal from the rotation angle sensor; and
swaging-state determination means determining, based on the stroke, the swaging state between the threaded member and the threaded portion of the workpiece.

11. A pressing apparatus comprising:
(a) a base holding a workpiece in which a to-be-assembled member is to be pressed and mounted;
(b) the rotational/axial-movement-transmitting unit according to claim 1 secured to the side remote from the threaded portion of the workpiece secured to the base; and
a pressing tool comprising a gripping member at one end and an engaging member at the other end,
the gripping member gripping the to-be-assembled member such that the to-be-assembled member can be attached and removed; and
the engaging member engaging with the rotational/axial-movement-transmitting end of the male threaded member to transmit the axial movement of the rotational/axial-movement-transmitting unit.

12. The pressing apparatus according to claim 11, the workpiece further comprising:
a shaft having an insertion groove at an eccentric position; and
a rotational body having an opposed insertion groove at an eccentric position and being rotatable relative to the shaft; wherein
the to-be-assembled member is a key disposed in the insertion groove of the shaft and in the opposed insertion groove of the rotational body so as to determine the positions of the shaft and the rotational body.

13. The pressing apparatus according to claim 11, the workpiece further comprising:
a shaft;
a rotational body rotatable relative to the shaft; and
a key disposed in the shaft and the rotational body so as to determine the positions of the shaft and the rotational body; wherein the to-be-assembled member is a locking component locking the key, the shaft, and the rotational body.

14. The pressing apparatus according to claim 11, wherein the rotary drive apparatus is a motor having a torque sensor, the pressing apparatus further comprising:
  a control unit controlling the motor, the control unit comprising:
    pressing-force instruction-value input means for inputting a pressing-force instruction-value of the pressing tool;
    pressing-force calculation means calculating a pressing force of the pressing tool based on a detection signal from the torque sensor; and
    rotation-torque control means controlling the rotation torque of the motor based on the pressing-force instruction-value and the pressing force.

15. The pressing apparatus according to claim 11, wherein the rotary drive apparatus is a motor having a rotation angle sensor, the pressing apparatus further comprising:
  a control unit controlling the motor, the control unit comprising:
    stroke calculation means calculating a stroke of the pressing tool based on a detection signal from the rotation angle sensor; and
    mounting-state determination means determining, based on the stoke, the mounting state of the member-being-assembled to the workpiece.

16. The pressing apparatus according to claim 11, wherein the rotary drive apparatus is a motor having a torque sensor and a rotation angle sensor, the pressing apparatus further comprising:
  a control unit controlling the motor, the control unit comprising:
    pressing-force instruction-value input means for inputting pressing-force instruction-values of the pressing tool, the instruction-values corresponding to a high pressing-force and a low pressing-force;
    pressing-force calculation means calculating a pressing force of the pressing tool based on a detection signal from the torque sensor;
    rotation-torque control means controlling the rotation torque of the motor based on the pressing-force instruction-value and the pressing force;
    stroke calculation means calculating a stroke of the pressing tool based on a detection signal from the rotation angle sensor when the motor is controlled by the rotation-torque control means; and
    failure determination means determining that the mounting state of the to-be-assembled member to the workpiece is faulty, if the stroke is equal to or more than a first predetermined value when the motor is controlled based on the pressing-force instruction-value of the low pressing-force, and the stroke is equal to or less than a second predetermined value when the motor is controlled based on the pressing-force instruction-value of the high pressing-force.

17. The pressing apparatus according to claim 16, the control unit further comprising operation-time calculation means calculating the operation time during which the motor is controlled by the rotation-torque control means, wherein
  the failure determination means determines that the mounting state of the to-be-assembled member to the workpiece is faulty, if the stroke is equal to or more than a first predetermined value when the motor is controlled for a first predetermined operation time based on the pressing-force instruction-value of the low pressing-force, and the stroke is equal to or less than a second predetermined value when the motor is controlled for a second predetermined operation time based on the pressing-force instruction-value of the high pressing-force.

18. The rotational/axial-movement-transmitting unit according to claim 1, wherein the rotation/axial-movement-transmitting end are selectively engaged with one of a threaded member assembling tool, a swaging tool and a pressing tool.

* * * * *